(12) United States Patent
Einstein et al.

(10) Patent No.: US 12,499,192 B2
(45) Date of Patent: Dec. 16, 2025

(54) METHODS, SYSTEMS, APPARATUSES, AND DEVICES FOR FACILITATING ACCURATE USER AUTHENTICATION

(71) Applicant: IsItMe LLC, Sheridan, WY (US)

(72) Inventors: Theodore Aaron Einstein, Boca Raton, FL (US); Arben Kane, Kula, HI (US); Tereza Manukian, Boca Raton, FL (US); Curtis Robert Dery, Lorette (CA); Boris Mocialov, Oslo (NO)

(73) Assignee: IsItMe LLC, Sheridan, WY (US)

( * ) Notice: Subject to any disclaimer, the term of this patent is extended or adjusted under 35 U.S.C. 154(b) by 0 days.

(21) Appl. No.: 19/189,337

(22) Filed: Apr. 25, 2025

(65) Prior Publication Data

US 2025/0265317 A1    Aug. 21, 2025

Related U.S. Application Data

(63) Continuation of application No. PCT/US2024/048742, filed on Sep. 27, 2024, which is a continuation-in-part of application No. 18/747,496, filed on Jun. 19, 2024, now Pat. No. 12,373,524, which is a continuation of application No. 18/109,932, filed on Feb. 15, 2023, now Pat. No. 12,045,327.

(60) Provisional application No. 63/311,033, filed on Feb. 16, 2022.

(51) Int. Cl.
    *G06F 21/31*    (2013.01)

(52) U.S. Cl.
    CPC .................................. *G06F 21/31* (2013.01)

(58) Field of Classification Search
    CPC ....................................................... G06F 21/31
    See application file for complete search history.

(56) References Cited

U.S. PATENT DOCUMENTS

| | | | |
|---|---|---|---|
| 9,967,750 B1* | 5/2018 | Fernandez | G06N 20/00 |
| 10,027,662 B1* | 7/2018 | Mutagi | H04L 63/0861 |
| 10,812,478 B1* | 10/2020 | Davis | G06F 21/40 |
| 2006/0218621 A1* | 9/2006 | Covington | H04L 63/08 726/1 |
| 2006/0236369 A1* | 10/2006 | Covington | H04W 12/08 726/1 |

(Continued)

*Primary Examiner* — James R Turchen
(74) *Attorney, Agent, or Firm* — Dhiraj Jindal; PATENT YOGI LLC

(57) ABSTRACT

A method for facilitating accurate user authentication includes initiating an authentication session for a user for an authentication instance associated with the user, identifying an authentication prompt for the authenticating of the user for the authentication instance based on the initiating, transmitting the authentication prompt to a user device associated with the user, obtaining an environment data associated with an environment of the user device based on the authentication prompt, obtaining a geolocation data associated with a geolocation of the user device based on the authentication prompt, analyzing the environment data using a machine learning model, generating an authentication status for the user based on the analyzing of the environment data and the geolocation data, terminating the authentication session based on the generating of the authentication status, and storing the authentication status.

20 Claims, 26 Drawing Sheets

(56) References Cited

U.S. PATENT DOCUMENTS

| | | | |
|---|---|---|---|
| 2015/0242605 A1* | 8/2015 | Du | G06F 21/32 |
| | | | 726/7 |
| 2016/0080936 A1* | 3/2016 | Rachuri | H04W 12/065 |
| | | | 726/7 |
| 2016/0112397 A1* | 4/2016 | Mankovskii | H04L 63/105 |
| | | | 726/6 |
| 2016/0337353 A1* | 11/2016 | Coats | H04W 12/06 |
| 2016/0380989 A1* | 12/2016 | Bailey | H04L 63/08 |
| | | | 726/5 |
| 2017/0374070 A1* | 12/2017 | Shah | H04L 63/20 |
| 2018/0227755 A1* | 8/2018 | Abernathy | H04W 4/38 |
| 2019/0108528 A1* | 4/2019 | Ramachandran | G06F 16/27 |
| 2019/0245877 A1* | 8/2019 | Toth | H04L 63/1425 |
| 2019/0260742 A1* | 8/2019 | Arora | H04W 12/65 |
| 2021/0350346 A1* | 11/2021 | Edwards | G06Q 20/1085 |
| 2022/0217141 A1* | 7/2022 | Arora | H04L 63/0876 |
| 2022/0335248 A1* | 10/2022 | Bhatt | G06N 20/00 |
| 2023/0091318 A1* | 3/2023 | Lindemann | H04L 63/0861 |
| | | | 726/4 |
| 2023/0177126 A1* | 6/2023 | Wieker | G06F 21/31 |
| | | | 726/1 |
| 2023/0308299 A1* | 9/2023 | Wattiau | G06F 21/31 |

\* cited by examiner

METHODS, SYSTEMS, APPARATUSES, AND DEVICES FOR FACILITATING ACCURATE USER AUTHENTICATION

REFERENCE TO RELATED APPLICATIONS

This application is a bypass application of International Application No. PCT PCT/US24/48742 filed on Sep. 27, 2024 and titled "METHODS, SYSTEMS, APPARATUSES, AND DEVICES FOR FACILITATING ACCURATE USER AUTHENTICATION", which in turn claims the benefit of the U.S. patent application Ser. No. 18/747,496, titled "METHODS AND SYSTEMS FOR FACILITATING AUTHENTICATING OF USERS", filed on Jun. 19, 2024, which in turn is a continuation application of U.S. patent application Ser. No. 18/109,932, titled "METHODS AND SYSTEMS FOR FACILITATING AUTHENTICATING OF USERS", filed Feb. 15, 2023, which in turn claims the benefit of U.S. Provisional Patent Application No. 63/311,033, titled "METHODS AND SYSTEMS FOR FACILITATING PERFORMING POINT-IN TIME AUTHENTICATION FOR AN INTERACTION USING BLOCKCHAIN", filed on 16 Feb. 2022, each of which is incorporated by reference herein in its entirety.

FIELD OF THE INVENTION

Generally, the present disclosure relates to the field of data processing. More specifically, the present disclosure relates to methods, systems, apparatuses, and devices for facilitating accurate user authentication.

BACKGROUND OF THE INVENTION

The field of data processing is technologically important to several industries, business organizations, and/or individuals.

Multi-factor authentication is a state of the art, digital proof-of-identity process. However, an inexperienced user may still accidentally (or not) grant access to an attacker by, for example, not seeing notifications due to deliberate jamming of the network or accidental approval of the malicious attack. Additionally, typical identity verification is only requested once when a user attempts to access a service.

Existing technologies for facilitating secure user authentication are deficient with regard to several aspects. Further, the current technologies are limited in accurately verifying the presence of a user in a specific location. The current technologies are prone to abuse by various malicious actors in a plethora of ways. Location spoofing, data breaches, stolen devices, SIM swapping, viruses, and deep fakes are only a few examples of how current technologies for secure user authentication have failed to deliver an accurate, safe, secure, timely, and immutably auditable authentication process.

Therefore, there is a need for improved methods, systems, apparatuses, and devices for facilitating accurate user authentication that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating accurate user authentication, in accordance with some embodiments. Accordingly, the method may include a step of initiating, using a processing device, an authentication session for a user for an authentication instance associated with the user. Further, the method may include a step of identifying, using the processing device, at least one authentication prompt for the authenticating of the user for the authentication instance based on the initiating. Further, the method may include a step of transmitting, using a communication device, the at least one authentication prompt to at least one user device associated with the user. Further, the method may include a step of obtaining, using the processing device, at least one environment data associated with an environment of the at least one user device based on the at least one authentication prompt. Further, the method may include a step of obtaining, using the processing device, at least one geolocation data associated with a geolocation of the at least one user device based on the at least one authentication prompt. Further, the method may include a step of analyzing, using the processing device, the at least one environment data using at least one machine learning model. Further, the method may include a step of generating, using the processing device, an authentication status for the user based on the analyzing of the at least one environment data, and the at least one geolocation data. Further, the method may include a step of terminating, using the processing device, the authentication session based on the generating of the authentication status. Further, the method may include a step of storing, using a storage device, the authentication status.

Further disclosed herein is a system for facilitating accurate user authentication, in accordance with some embodiments. Accordingly, the system may include a processing device, a communication device, and a storage device. Further, the processing device may be configured for initiating an authentication session for a user for an authentication instance associated with the user. Further, the processing device may be configured for identifying at least one authentication prompt for the authenticating of the user for the authentication instance based on the initiating. Further, the processing device may be configured for obtaining at least one environment data associated with an environment of at least one user device based on the at least one authentication prompt. Further, the processing device may be configured for obtaining at least one geolocation data associated with a geolocation of the at least one user device based on the at least one authentication prompt. Further, the processing device may be configured for analyzing the at least one environment data using at least one machine learning model. Further, the processing device may be configured for generating an authentication status for the user based on the analyzing of the at least one environment data, and the at least one geolocation data. Further, the processing device may be configured for terminating the authentication session based on the generating of the authentication status. Further, the communication device may be communicatively coupled with the processing device. Further, the communication device may be configured for transmitting the at least one authentication prompt to the at least one user device associated with the user. Further, the storage device may be communicatively coupled with the storage device. Further, the storage device may be configured for storing the authentication status.

Both the foregoing summary and the following detailed description provide examples and are explanatory only.

Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
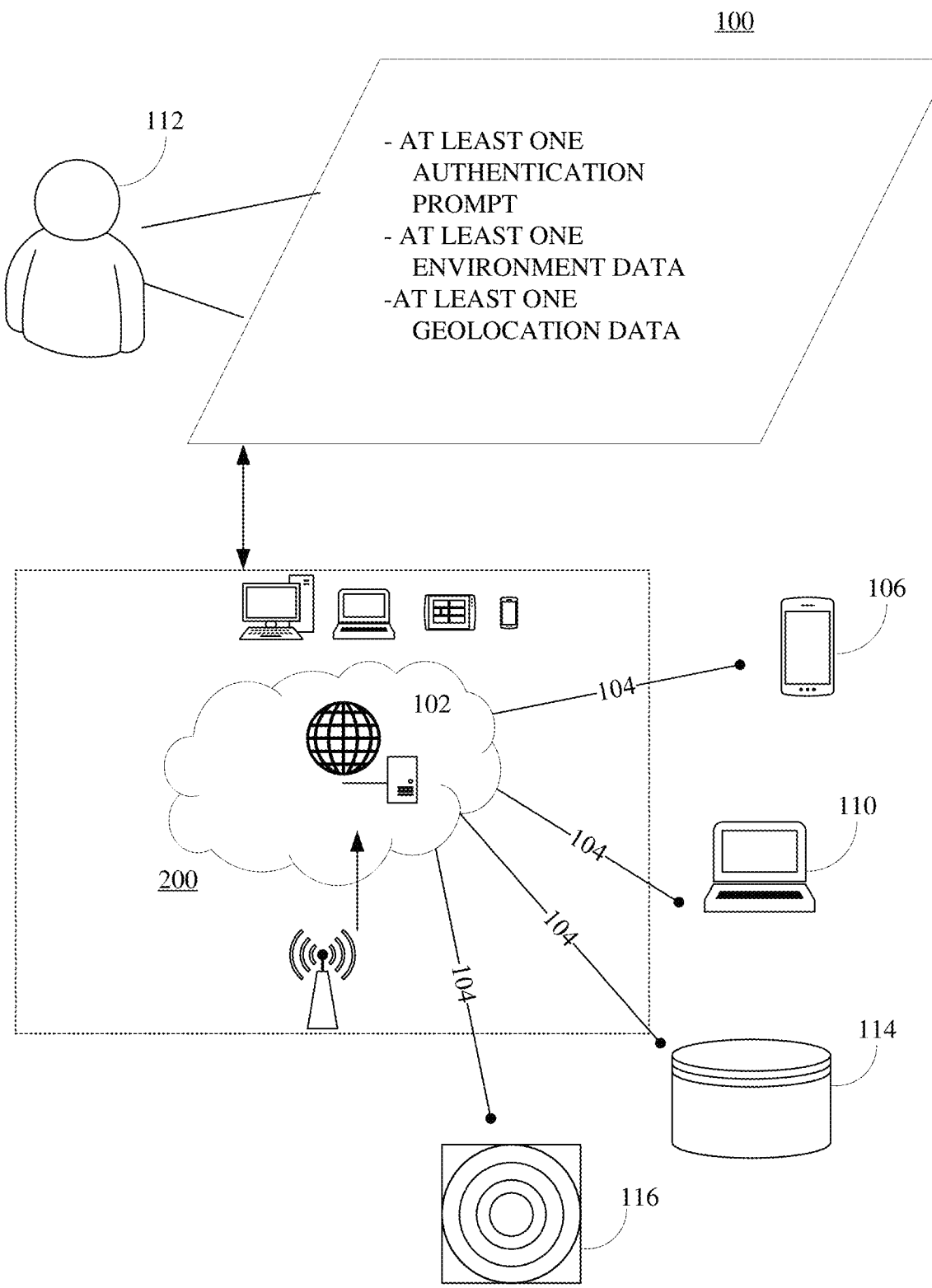
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating accurate user authentication, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating accurate user authentication.

Further, the present disclosure describes an advanced authentication mechanism that combines geolocation data and environmental scanning via the user's device camera, enhanced with optimal machine learning and AI models. Further, the advanced authentication mechanism may be associated with the disclosed methods, systems, apparatuses, and devices. The methods associated with the advanced authentication mechanism include capturing the user's surroundings through the camera and analyzing this data along with geolocation information to ensure accurate and secure user authentication. Further, the accurate and secure user authentication is ensured by verifying the user's presence at a specific location through environmental context and global positioning system (GPS) data, supported by convolutional neural networks (CNNs) for image recognition and recurrent neural networks (RNNs) for sequential data analysis, this method provides a robust multi-factor authentication solution.

Further, the present disclosure describes AI models like Random Forest for anomaly detection and k-Nearest Neighbors (k-NN) for pattern matching further enhance security. Further, the authentication use cases include high-security applications such as financial transactions, sensitive data access, and secure facility entry. In these scenarios, the best approach involves capturing the user's environment in real-time, using CNNs to identify unique environmental features, and RNNs to analyze temporal patterns in the data. The Random Forest models may detect unusual patterns indicative of spoofing attempts, while k-NN may match captured environmental data with known landmarks for accurate location verification. This comprehensive method significantly reduces the risk of unauthorized access by adding an extra layer of verification that is difficult to spoof, ensuring a secure and trustworthy authentication process.

Further, the present disclosure describes methods and systems for facilitating authenticating of users. Further, the authenticating of the user may include accurate user authentication.

Further, the present disclosure describes methods and systems for facilitating and performing point-in-time authentication for an interaction using blockchain. Further, the disclosed system may include a point-in-time, proof of identity platform that presents a user with multiple random challenges based on deep-learning models. Further, the multiple random challenges may be intended to prove, within a high likelihood, that the user is who they purport to be. Further, the disclosed system may be associated with a software platform (such as a software application and website). The disclosed system tokenizes each authentication attempt (which includes but is not limited to, biometric verification, gesture matching and recognition, trusted device recognition, geolocational data assessment, verification of a shared secret, detection of biometric and gesture manipulation, voice/pre-defined phrase matching, etc.) on a blockchain to maintain an immutable and auditable trail in a format that may be easily verified, retrieved, and transacted.

Further, the disclosed system may be intended to be leveraged at the exact point and time when a party involved in a communication or transaction needs to be validated for authenticity, not just for initial access. Further, the disclosed system may engage the user in a tokenized point-in-time authentication process. The disclosed system utilizes system-guided features to prompt the user to adhere to the guided steps on the screen. Further, data collected from the interaction process between the user and the authentication system may be propagated into the deep-learning models. Further, the deep learning models may include facial recognition, biometric recognition, gesture matching, audio recognition, current/historical geolocation data, trusted device verification, and various other algorithmic methods of human authentication, in order to accurately authenticate a subscribing user (or the user). The disclosed method (or point-in-time multi-factor authentication process) not only offers various layers of protection but also tokenizes and records data associated with each authentication attempt on the blockchain, providing an immutable and auditable trail, making the disclosed system a robust and secure solution for proof of identity.

Further, the disclosed system supports multi-factor authentication by design. Further, 'something you know' requirement is met by solving a physical, in-person challenge that is uniquely generated for each authentication instance, 'something you have' requirement is met by having a device such as a phone in your hands during the authentication process, and 'something you are' requirement is met by recognizing current user from a database of known people.

Further, point-in-time proof of identity ensures that every significant transaction is verified, disclosed, and recorded on the blockchain. The disclosed system focuses on making in-person identity verification a point-in-time imperative where the validity and value of a person's "point-in-time" identity decrease over time based on when the point-in-time identity was last verified, the specific methods used in the identification, as well as when the identity was stored on the blockchain.

Further, by utilizing the disclosed system, a person that wants to be authenticated for a specific need may have to undergo a multi-factor authentication process. Depending on the material importance of the specific underlying authentication use case, the disclosed system may present the user with varying degrees of secure authentication. Irrelevant to the material importance of the specific authentication use case, the disclosed system may first try to visually recognize the user based on previous self-identifying images provided by the subscribing user (i.e. personal photos). Once the disclosed system has successfully identified the user via facial recognition, the disclosed system may have the user perform a number of gestures, where the number of gestures and type of gestures is random and unknown to the user until the immediate, point-in-time, when the user is undergoing the authentication process. Further, the disclosed system offers a library of gestures for the user to match and get recognized by the platform. Further, the gestures prompted to the user may vary and this variability further reinforces the validation process that the person attempting to authenticate is in fact the intended user. The disclosed system (or point-in-time proof of identity system) uses deep learning techniques in order to (re-)identify people, recognize gestures, and detect any sinister artifacts present in the video and audio stream or manipulation of the video stream which would indicate a deep fake. Based on the user's accuracy in properly performing the gestured response, the timing of their gestured responses, along with analysis determining the validity of the user's video verification, as well as the predefined material importance of the specific underlying authentication use case, the user may be prompted for additional personal identification data (i.e. government identification, pay stub, etc.). In conjunction with the user-provided data collected upon the point-in-time interaction, additional data points may be analyzed (i.e. geolocation data, trusted device fingerprint, audio samples, etc.) to determine if the user has properly authenticated their identity. Irrespective of whether the user is successfully or unsuccessfully being identified, all of the aforementioned data may be tokenized as a non-fungible token (NFT) and stored on the blockchain. The tokenized authentication attempts associated with the NFTs may then be leveraged by the user or any other entity, with access to the token, to prove the user's point-in-time identification so that trust in transactions, communications, and audibility is properly established.

Further, requests to adhere to directions on a screen may include but are not limited to matching various gestures, emotions, or phrases, matching self-provided secrets (images or words), as well as trusted device verification and geolocational data collection, and so on. Further, the disclosed method may include a facial recognition process and a gesture-matching process. Further, the facial recognition process and the gesture matching process may be depicted in FIG. 15-FIG. 18. Further, in FIG. 15 and FIG. 17, a person is being authenticated and is currently not fully authenticated. Further, FIG. 16 and FIG. 18 illustrate a generated challenge in the form of a gesture that the user is requested to match. Further, the gestures, in this scenario, may either be static (e.g. handshape) or dynamic (e.g. hand movement in a specific direction). Further, FIG. 16 and FIG. 18 illustrate that the gesture has been matched and recognized and the user is now verified because the challenge has been solved.

Further, the disclosed system may create a tokenized record where a user is required to perform point-in-time authentication for any transaction or interaction where proof of identity is critical (i.e. establishing true point-of-time identity in a metaverse/virtual world, financial transactions, dating websites, legal transactions, providing sexual and non-sexual consent, and various other point-in-time identity-based verification use cases). By recording the authentication data associated with the point-in-time authentication on a blockchain, the disclosed system provides an immutable, historical view of each authentication attempt, along with the associated pieces of data related to each authentication attempt. The authentication data may be analyzed at a point in time to determine if the artifacts or behaviors present in the user authentication stream consist of fake videos, unauthorized identity attempts, and fraudulent identity attempts by a bad actor. Furthermore, the non-fungible tokenization of each point-in-time proof of identity attempt allows for the ability to prove identity at a specific time and transact and transfer this proof of identity to various third-party systems. In addition, the disclosed system generates a list of validation criteria that is unknown in advance and cannot be exploited. Moreover, the disclosed system records each attempt to prove the identity on the blockchain for extra safety.

Further, the present disclosure relates generally to data processing. More specifically, the present disclosure describes methods and systems for facilitating performing point-in-time authentication for an interaction using blockchain FIG. 1 is an illustration of an online platform 100 consistent with various embodiments of the present disclosure. By way of non-limiting example, the online platform 100 to facilitate accurate user authentication may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
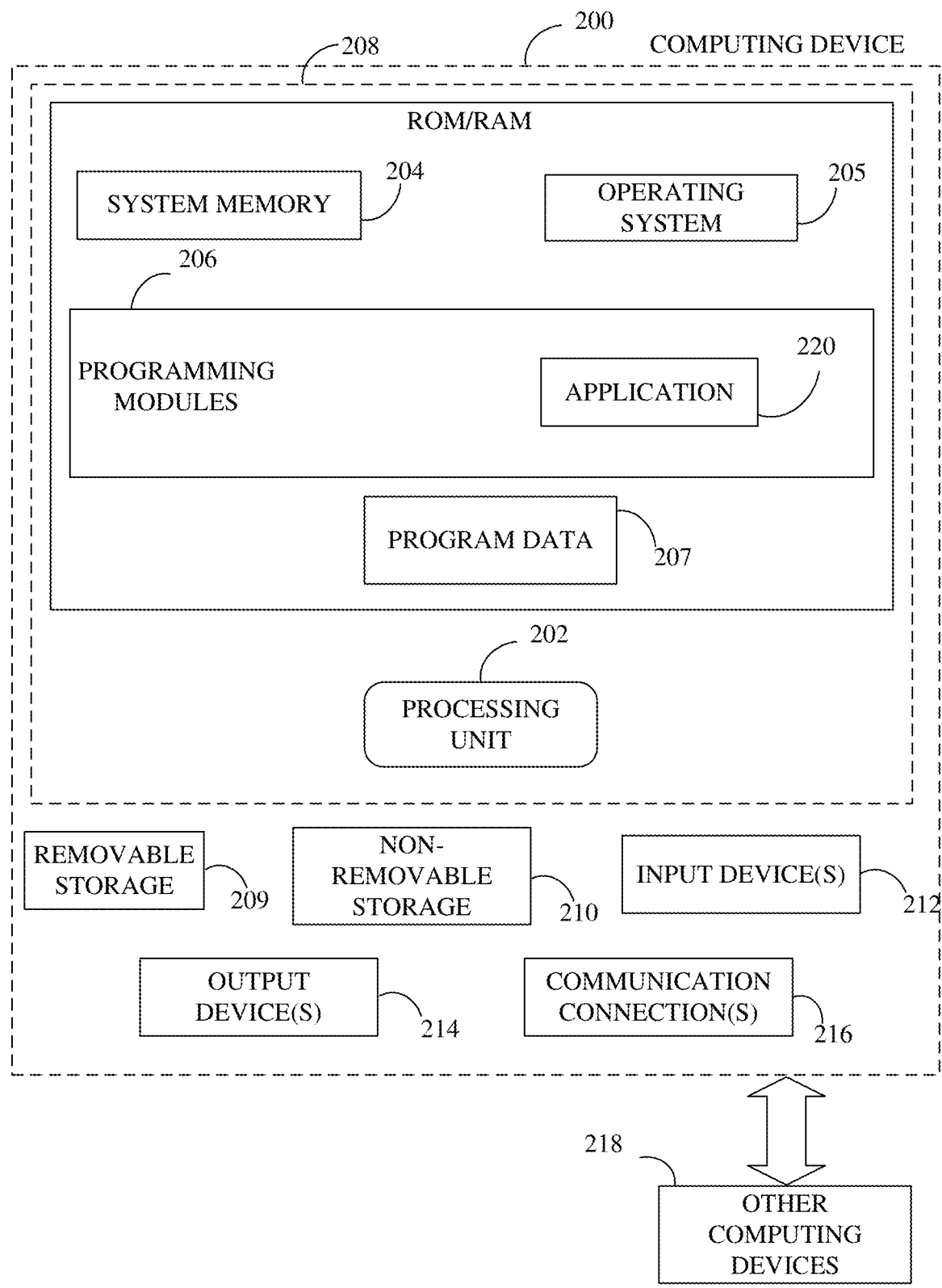
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing modules, machine learning modules, etc. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable, and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
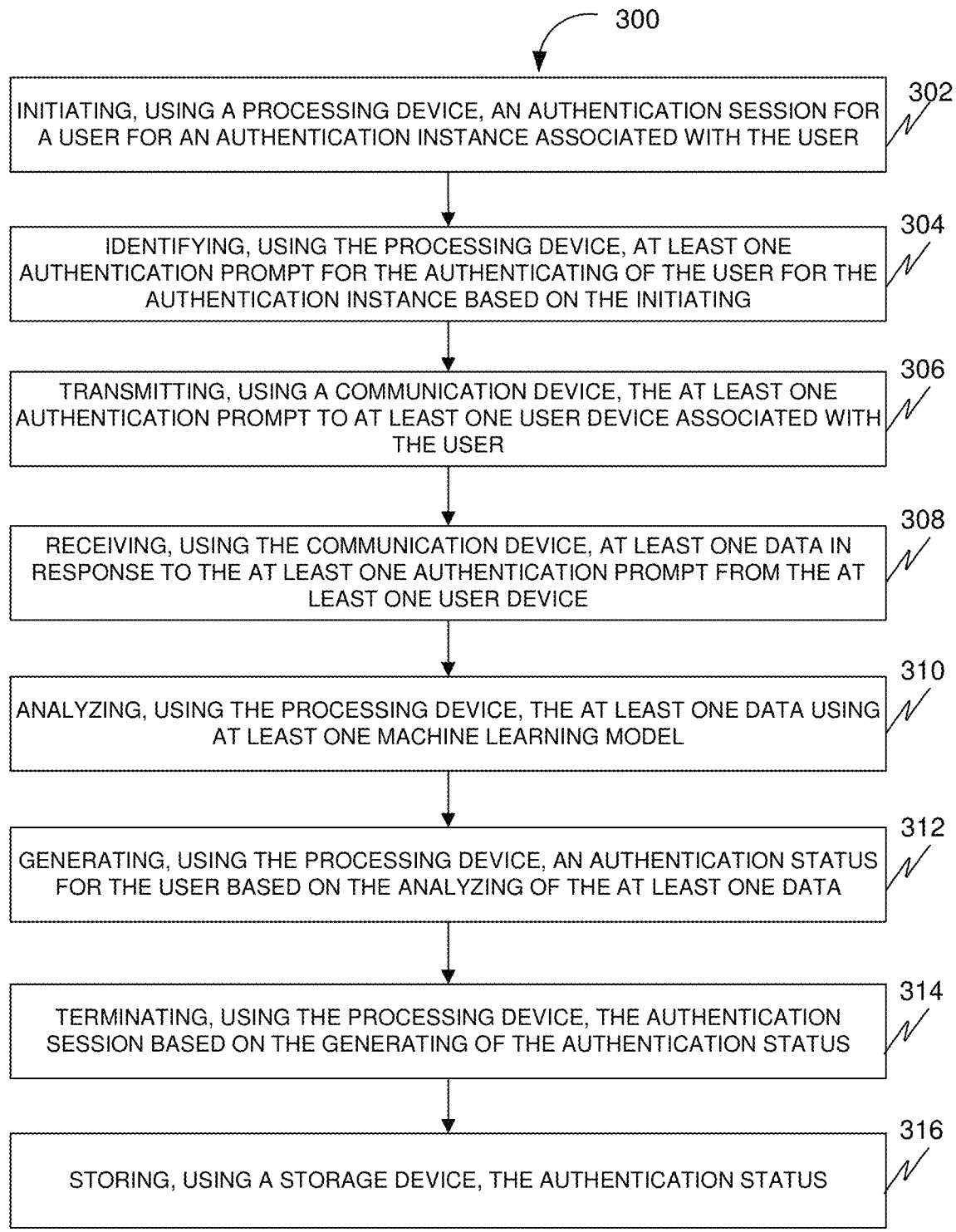
FIG. 3 is a flowchart of a method 300 of facilitating authenticating of users, in accordance with some embodiments.

FIG. 3 is a flowchart of a method 300 of facilitating authenticating of users, in accordance with some embodiments. Accordingly, at 302, the method 300 may include initiating, using a processing device, an authentication session for a user for an authentication instance associated with the user. Further, the user may be authenticated during the authentication session. Further, the user may be an individual. Further, the authenticating may include a point-in-time authentication of the user. Further, the authentication instance may include a transaction, an interaction, etc. where proof of identity of the user may be critical.

Further, at 304, the method 300 may include identifying, using the processing device, one or more authentication prompts for the authenticating of the user for the authentication instance based on the initiating. Further, the one or more authentication prompts may include one or more instructions and one or more directions for the user to perform one or more actions. Further, the one or more actions may include performing gestures, uttering phrases and words, providing secret images and words, performing tasks, enabling geolocation, etc. Further, the one or more instructions and one or more directions may include textual content, audio content, graphical content, multimedia content, etc. Further, the one or more authentication prompts may include at least one gesture challenge information.

Further, at 306, the method 300 may include transmitting, using a communication device, the one or more authentication prompts to one or more user devices associated with the user. Further, the one or more user devices (at least one user device) may include computing devices, client devices, etc. Further, the one or more user devices may be configured for presenting the one or more authentication prompts to the user.

Further, at 308, the method 300 may include receiving, using the communication device, one or more data in response to the one or more authentication prompts from the one or more user devices. Further, the one or more data corresponds to the one or more actions. Further, the one or more data may include responses (gesture response) from the user for the one or more instructions and the one or more directions. Further, the one or more data may include a video stream, an audio stream, a geolocation stream, etc. of the user. Further, the one or more data may include an input data. Further, the one or more user devices may be configured for generating the one or more data.

Further, at 310, the method 300 may include analyzing, using the processing device, the one or more data using one or more machine learning models. Further, in an instance, the one or more machine learning models may be configured for detecting an anomaly in the one or more data. Further, in an instance, the anomaly may include a discrepancy between the one or more data and one or more previous data associated with the user. Further, the one or more previous data may include a user data. Further, in an instance, the anomaly may include a fraudulent activity. Further, the one or more machine learning models may be configured for performing facial recognition, movement identification, object identification, voice recognition, gesture identification, etc. Further, the at least one data may include authentication data. Further, in an instance, the one or more machine learning models may be configured for determining a reliability score of the one or more data.

Further, at 312, the method 300 may include generating, using the processing device, an authentication status for the user based on the analyzing of the one or more data. Further, the authentication status may include a successful identification and an unsuccessful identification of the user. Further, the generating of the authentication status may be based on the anomaly. Further, the authentication status may include the successful identification based on an absence of the anomaly. Further, the authentication status may include the unsuccessful identification based on a presence of the anomaly. Further, the authentication status may be an identification status, a gesture status, a verification status, etc. for the user.

Further, at 314, the method 300 may include terminating, using the processing device, the authentication session based on the generating of the authentication status.

Further, at 316, the method 300 may include storing, using a storage device, the authentication status.

Figure 4:
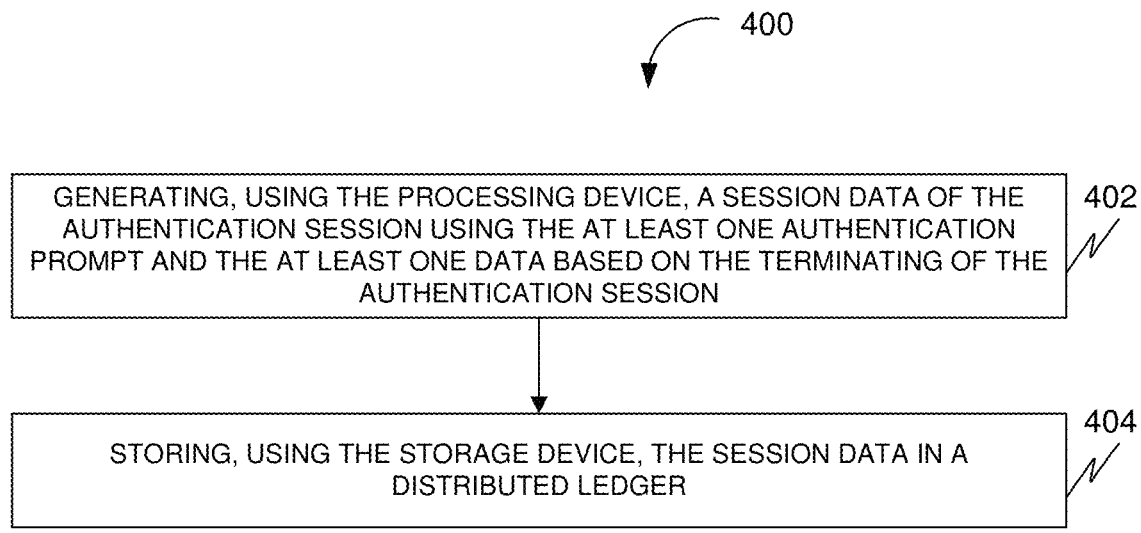
FIG. 4 is a flowchart of a method 400 of facilitating authenticating of users including generating, using the processing device, a session data of the authentication session using the at least one authentication prompt and the at least one data, in accordance with some embodiments.

FIG. 4 is a flowchart of a method 400 of facilitating authenticating of users including generating, using the processing device, a session data of the authentication session using the at least one authentication prompt and the at least one data, in accordance with some embodiments.

Further, in some embodiments, at 402, the method 400 may include generating, using the processing device, a session data of the authentication session using the one or more authentication prompts and the one or more data based on the terminating and the initiating. Further, the authentication session corresponds to an authentication attempt from the user. Further, the session data may include an initiating instance, a terminating instance, a user's interaction, the at least one authentication prompt, the at least one data, etc.

Further, the session data Further, in some embodiments, at 404, the method 400 may include storing, using the storage device, the session data in a distributed ledger. Further, the distributed ledger may be associated with a blockchain.

Figure 5:
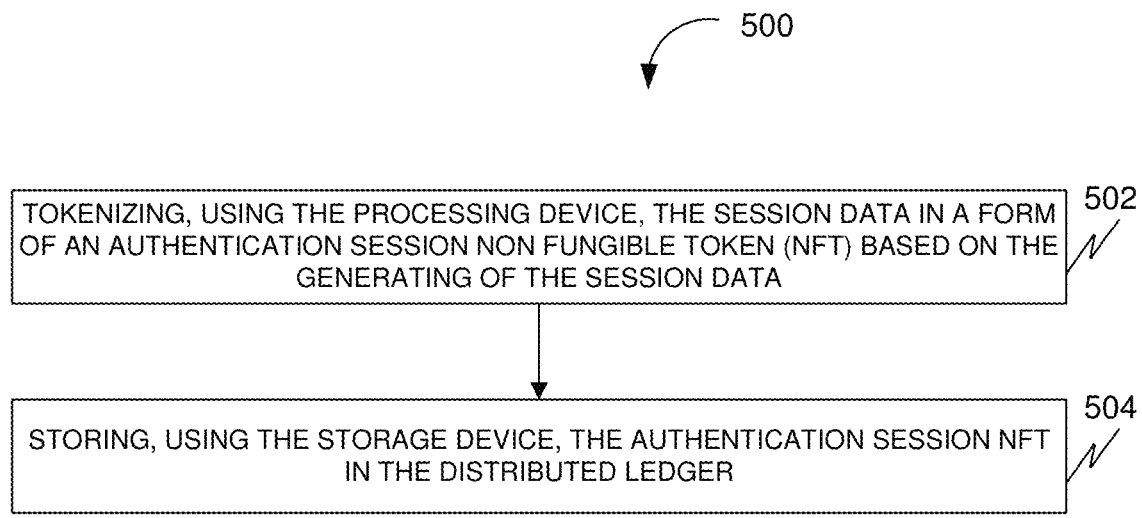
FIG. 5 is a flowchart of a method 500 of facilitating authenticating of users including tokenizing, using the processing device, the session data in a form of an authentication session non fungible token (NFT), in accordance with some embodiments.

FIG. 5 is a flowchart of a method 500 of facilitating authenticating of users including tokenizing, using the processing device, the session data in a form of an authentication session non fungible token (NFT), in accordance with some embodiments.

Further, in some embodiments, at 502, the method 500 may include tokenizing, using the processing device, the session data in a form of an authentication session non fungible token (NFT) based on the generating of the session data. Further, the tokenizing may include minting the authentication session NFT using the session data. Further, the authentication session NFT may be a non fungible token (NFT). Further, in some embodiments, at 504, the method 500 may include storing, using the storage device, the authentication session NFT in the distributed ledger.

Figure 6:
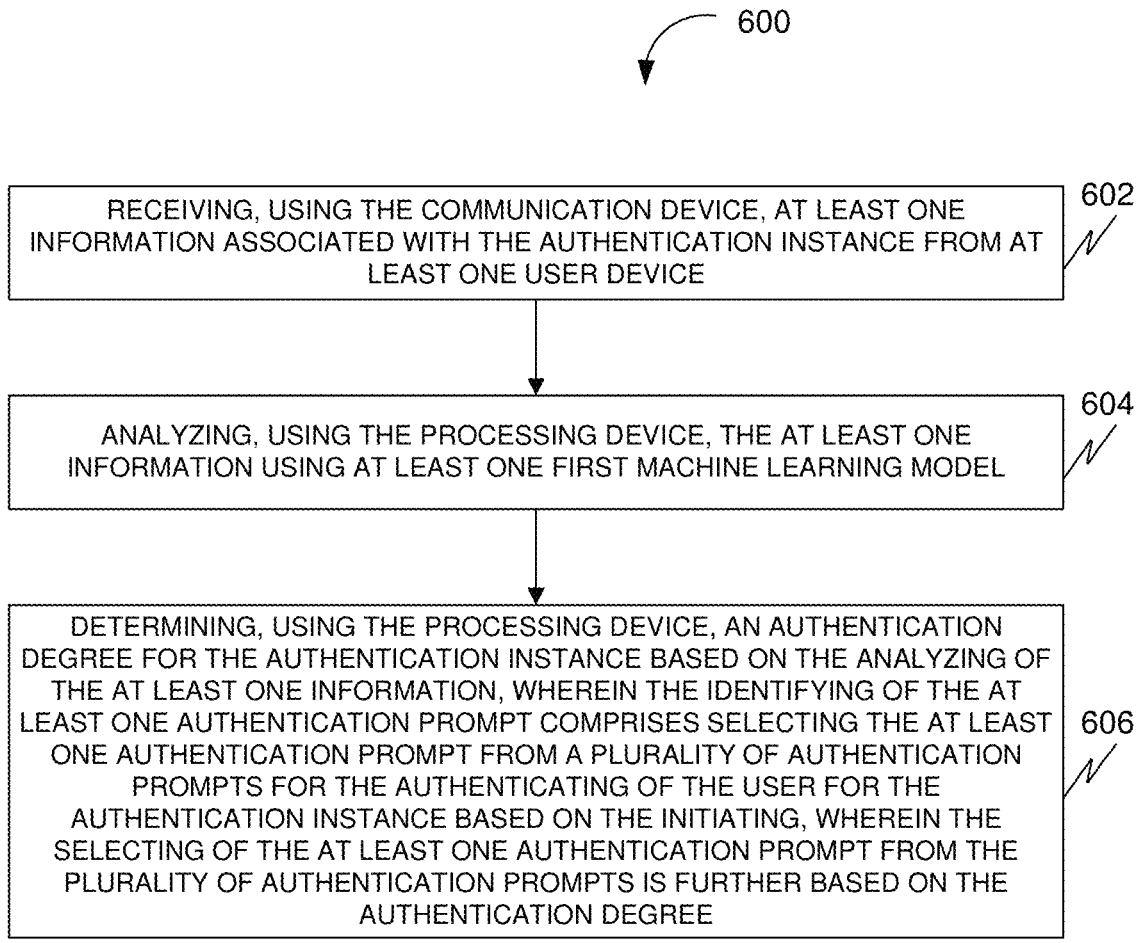
FIG. 6 is a flowchart of a method 600 of facilitating authenticating of users including determining, using the processing device, an authentication degree for the authentication instance, in accordance with some embodiments.

FIG. 6 is a flowchart of a method 600 of facilitating authenticating of users including determining, using the processing device, an authentication degree for the authentication instance, in accordance with some embodiments.

Further, in some embodiments, at 602, the method 600 may include receiving, using the communication device, one or more information associated with the authentication instance from the one or more devices. Further, the one or more devices may include computing devices, client devices, etc. Further, the authentication instance corresponds to an authentication use case. Further, the one or more information may include any information describing a material importance of the authentication use case. Further, the material importance may be a level of at least one of an importance and a significance of the authentication use case for the authentication of the user. Further, at 604, the method 600 may include analyzing, using the processing device, the one or more information using one or more first machine learning models. Further, the one or more first machine learning models determine the material importance of the authentication use case and rank the material importance. Further, the material importance may be ranked in an ascending order of the material importance, a descending order of the material importance, an order of the material importance based on at least one criterion, etc. Further, at 606, the method 600 may include determining, using the processing device, an authentication degree for the authentication instance based on the analyzing of the one or more information. Further, the authentication degree corresponds to a rank of the material importance of the authentication use case. Further, the identifying of the one or more authentication prompts includes selecting the one or more authentication prompts from two or more authentication prompts for the authenticating of the user for the authentication instance based on the initiating. Further, the selecting of the one or more authentication prompts from the two or more authentication prompts may be further based on the authentication degree.

In some embodiments, the one or more authentication prompts include a first authentication prompt for prompting the user to provide an image of the user based on the authentication degree. Further, the image may include a facial image of the user. Further, the one or more user devices include two or more sensors. Further, the two or more sensors may include a visible light camera, an infrared camera, a motion sensor, an eye tracking sensor, a microphone, a location sensor, etc. Further, at least one first sensor of the two or more sensors may be configured for generating one or more image data of the user based on capturing the image of the user. Further, the one or more data includes the one or more image data.

In some embodiments, the one or more authentication prompts further include a second authentication prompt for prompting the user to perform one or more gestures based on the authentication degree. Further, the one or more gestures include a hand signal, a hand movement, a head movement, a body movement, etc. Further, at least one second sensor of the two or more sensors may be configured for generating one or more gesture data based on capturing a performance of the one or more gestures by the user. Further, the one or more data includes the one or more gesture data.

In some embodiments, the one or more authentication prompts further include a third authentication prompt for prompting the user to provide one or more additional identification objects of the user based on the authentication degree. Further, the one or more additional identification objects may include government identification, pay stub, etc. Further, at least one third sensor of the two or more sensors may be configured for generating one or more object data based on capturing the one or more additional identification objects of the user. Further, the one or more data includes the one or more object data. Further, the one or more object data may include one or more images of the one or more additional identification objects, a personal information (PI) data of the user, etc.

In some embodiments, the one or more authentication prompts further include a fourth authentication prompt for prompting the user to provide one or more biometrics of the user based on the authentication degree. Further, at least one fourth sensor of the two or more sensors may be configured for generating one or more biometric data based on capturing the one or more biometrics (biometric variables) of the user. Further, the one or more data includes the one or more biometric data. Further, the one or more biometrics may include fingerprints, facial, voice, iris, palm or finger vein patterns, signature, gait, keystroke dynamics, etc. Further, the one or more biometrics uniquely identifies the user.

In some embodiments, the one or more authentication prompts further include a fifth authentication prompt for prompting the user to provide a geolocation of the user based on the authentication degree. Further, at least one fifth sensor of the two or more sensors may be configured for generating one or more location data based on capturing the geolocation of the user. Further, the one or more data includes the one or more location data.

Figure 7:
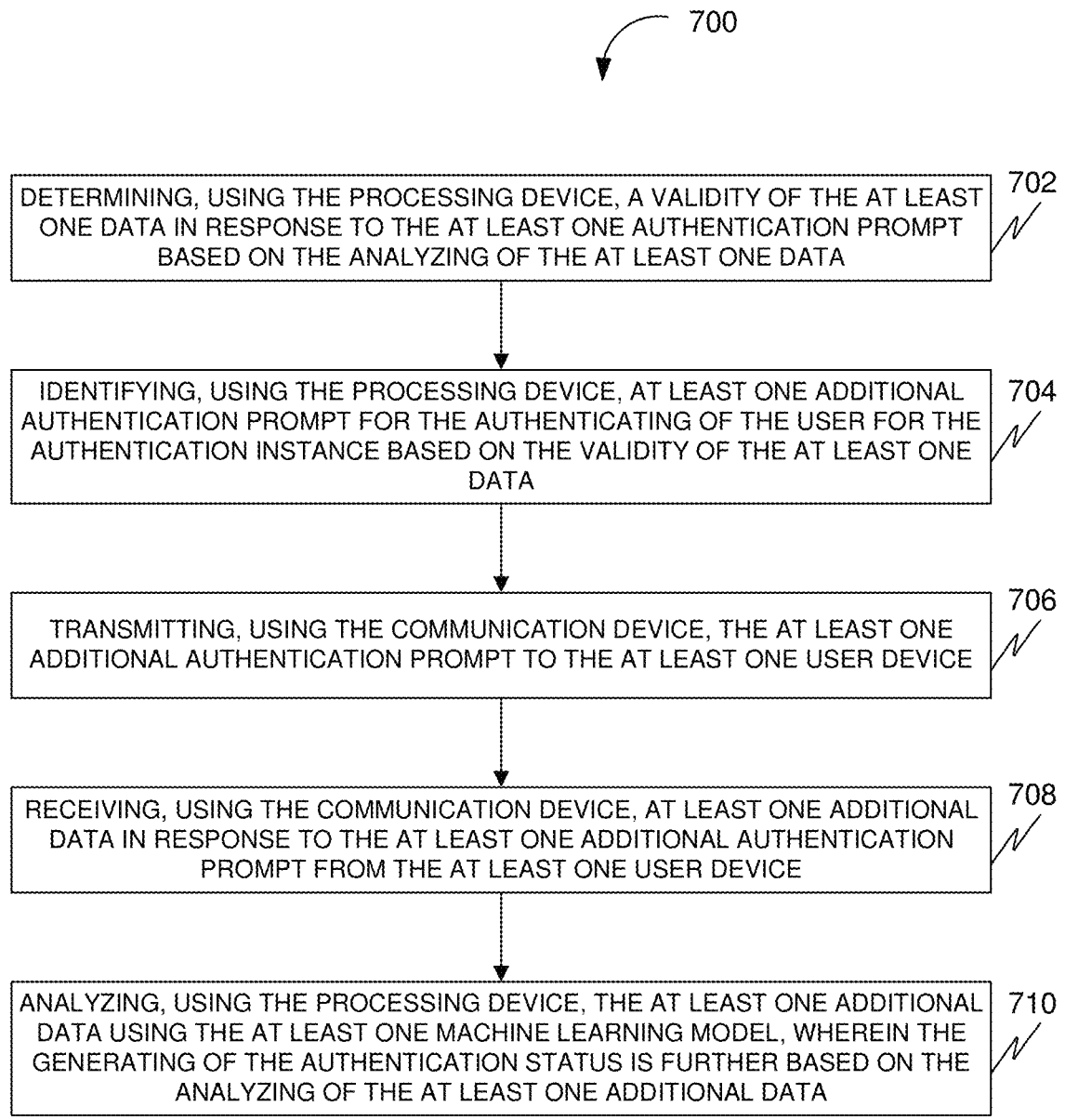
FIG. 7 is a flowchart of a method 700 of facilitating authenticating of users including determining, using the processing device, a validity of the at least one data in response to the at least one authentication prompt, in accordance with some embodiments.

FIG. 7 is a flowchart of a method 700 of facilitating authenticating of users including determining, using the processing device, a validity of the at least one data in response to the at least one authentication prompt based on the analyzing of the at least one data, in accordance with some embodiments.

Further, in some embodiments, at 702, the method 700 may include determining, using the processing device, a validity of the one or more data in response to the one or more authentication prompts based on the analyzing of the one or more data. Further, the validity corresponds to an accuracy in the performing of the one or more actions, the one or more responses, etc. Further, the accuracy may be determined based on timing (time duration) of the one or more actions. Further, at 704, the method 700 may include identifying, using the processing device, one or more additional authentication prompts for the authenticating of the user for the authentication instance based on the validity of the one or more data. Further, at 706, the method 700 may include transmitting, using the communication device, the one or more additional authentication prompts to the one or more user devices. Further, at 708, the method 700 may include receiving, using the communication device, one or more additional data in response to the one or more additional authentication prompts from the one or more user devices. Further, at 710, the method 700 may include analyzing, using the processing device, the one or more additional data using the one or more machine learning models. Further, the generating of the authentication status may be based on the analyzing of the one or more additional data.

Figure 8:
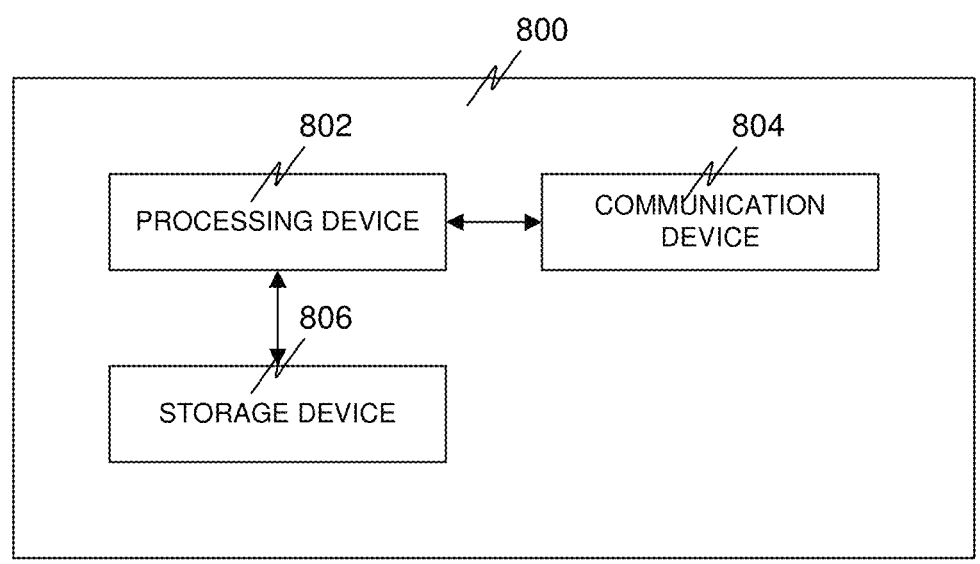
FIG. 8 is a block diagram of a system 800 for facilitating authenticating of users, in accordance with some embodiments.

FIG. 8 is a block diagram of a system 800 for facilitating authenticating of users, in accordance with some embodiments. Accordingly, the system 800 may include a processing device 802. Further, the processing device 802 may be configured for initiating an authentication session for a user for an authentication instance associated with the user. Further, the processing device 802 may be configured for identifying one or more authentication prompts for the authenticating of the user for the authentication instance based on the initiating. Further, the processing device 802 may be configured for analyzing one or more data using one or more machine learning models. Further, the processing device 802 may be configured for generating an authentication status for the user based on the analyzing of the one or more data. Further, the processing device 802 may be configured for terminating the authentication session based on the generating of the authentication status.

Figure 9:
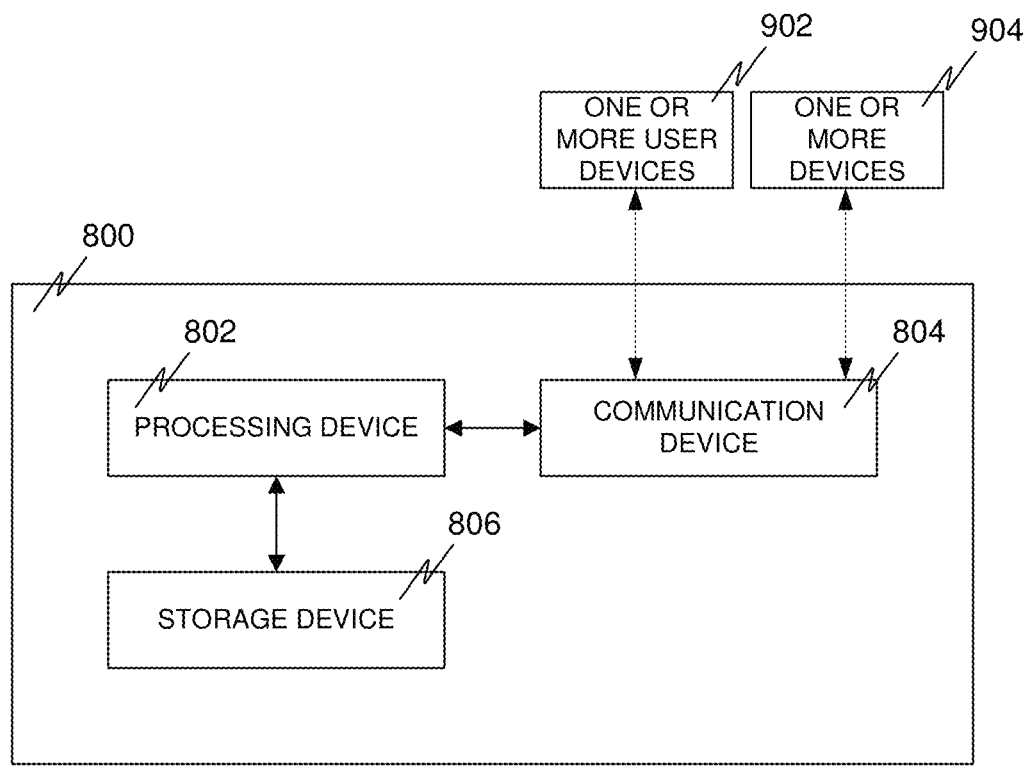
FIG. 9 is a block diagram of the system 800, in accordance with some embodiments.

Further, the system 800 may include a communication device 804 communicatively coupled with the processing device 802. Further, the communication device 804 may be configured for transmitting the one or more authentication prompts to one or more user devices 902, as shown in FIG. 9, associated with the user. Further, the communication device 804 may be configured for receiving the one or more data in response to the one or more authentication prompts from the one or more user devices 902.

Further, the system 800 may include a storage device 806 communicatively coupled with the processing device 802. Further, the storage device 806 may be configured for storing the authentication status.

In some embodiments, the processing device 802 may be further configured for generating a session data of the authentication session using the one or more authentication prompts and the one or more data based on the terminating and the initiating. Further, the storage device 806 may be configured for storing the session data in a distributed ledger.

In some embodiments, the processing device 802 may be further configured for tokenizing the session data in a form of an authentication session non fungible token (NFT) based on the generating of the session data. Further, the storage device 806 may be configured for storing the authentication session NFT in the distributed ledger.

Further, in some embodiments, the communication device 804 may be configured for receiving one or more information associated with the authentication instance from one or more devices 904, as shown in FIG. 9. Further, the processing device 802 may be configured for analyzing the one or more information using one or more first machine learning models. Further, the processing device 802 may be configured for determining an authentication degree for the authentication instance based on the analyzing of the one or more information. Further, the identifying of the one or more authentication prompts includes selecting the one or more authentication prompts from two or more authentication prompts for the authenticating of the user for the authentication instance based on the initiating. Further, the selecting of the one or more authentication prompts from the two or more authentication prompts may be further based on the authentication degree.

Figure 10:
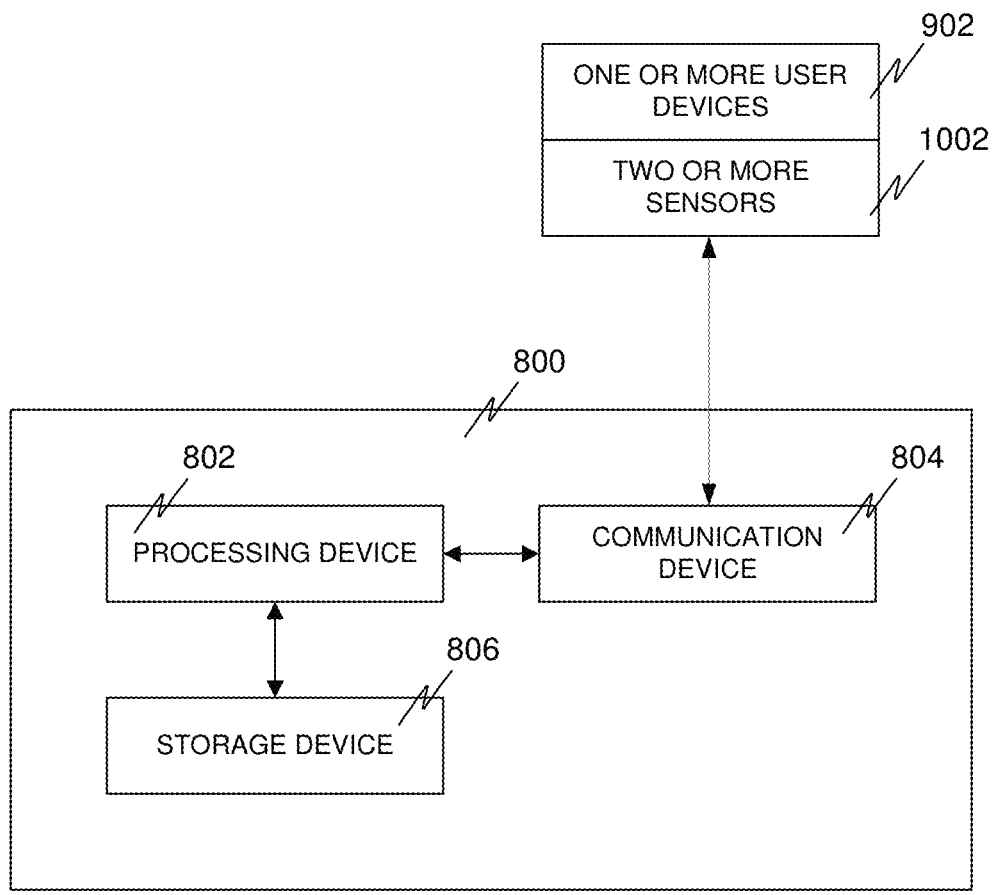
FIG. 10 is a block diagram of the system 800, in accordance with some embodiments.

In some embodiments, the one or more authentication prompts include a first authentication prompt for prompting the user to provide an image of the user based on the authentication degree. Further, the one or more user devices 902 include two or more sensors 1002, as shown in FIG. 10. Further, at least one first sensor of the two or more sensors 1002 may be configured for generating one or more image data of the user based on capturing the image of the user. Further, the one or more data includes the one or more image data.

In some embodiments, the one or more authentication prompts further include a second authentication prompt for prompting the user to perform one or more gestures based on the authentication degree. Further, at least one second sensor of the two or more sensors 1002 may be configured for generating one or more gesture data based on capturing a performance of the one or more gestures by the user. Further, the one or more data includes the one or more gesture data.

In some embodiments, the one or more authentication prompts further include a third authentication prompt for prompting the user to provide one or more additional identification objects of the user based on the authentication degree. Further, at least one third sensor of the two or more sensors 1002 may be configured for generating one or more object data based on capturing the one or more additional identification objects of the user. Further, the one or more data includes the one or more object data.

In some embodiments, the one or more authentication prompts further include a fourth authentication prompt for prompting the user to provide one or more biometrics of the user based on the authentication degree. Further, at least one fourth sensor of the two or more sensors 1002 may be configured for generating one or more biometric data based on capturing the one or more biometrics of the user. Further, the one or more data includes the one or more biometric data.

In some embodiments, the one or more authentication prompts further include a fifth authentication prompt for prompting the user to provide a geolocation of the user based on the authentication degree. Further, at least one fifth sensor of the two or more sensors 1002 may be configured for generating one or more location data based on capturing the geolocation of the user. Further, the one or more data includes the one or more location data.

Further, in some embodiments, the processing device 802 may be further configured for determining a validity of the one or more data in response to the one or more authentication prompts based on the analyzing of the one or more data. Further, the processing device 802 may be configured for identifying one or more additional authentication prompts for the authenticating of the user for the authentication instance based on the validity of the one or more data. Further, the processing device 802 may be configured for analyzing one or more additional data using the one or more machine learning models. Further, the generating of the authentication status may be based on the analyzing of the one or more additional data. Further, the communication device 804 may be configured for. Further, the processing device 802 may be further configured for transmitting the one or more additional authentication prompts to the one or more user devices 902. Further, the processing device 802 may be further configured for receiving the one or more additional data in response to the one or more additional authentication prompts from the one or more user devices 902.

FIG. 9 is a block diagram of the system 800, in accordance with some embodiments.

FIG. 10 is a block diagram of the system 800, in accordance with some embodiments.

Figure 11:
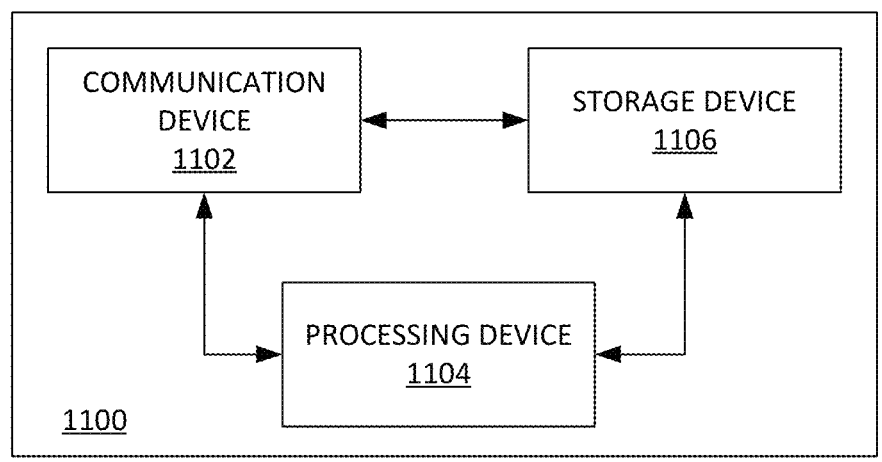
FIG. 11 is a block diagram of a system 1100 for facilitating performing point-in-time authentication for an interaction using blockchain, in accordance with some embodiments.

FIG. 11 is a block diagram of a system 1100 for facilitating performing point-in-time authentication for an interaction using blockchain, in accordance with some embodiments. Accordingly, the system 1100 may include a communication device 1102, a processing device 1104, and a storage device 1106. Further, the communication device 1102 may be configured for receiving an authentication request from at least one user device associated with at least one user. Further, the authentication request may indicate that at least one user may want to perform point-in-time authentication for at least one interaction. Further, at least one interaction may include an online payment transaction. Further, at least one user may include an individual, an institution, and an organization. Further, at least one user device may include a smartphone, a tablet, a mobile, a laptop, a personal computer, and so on. Further, the communication device 1102 may be configured for transmitting at least one gesture challenge information to at least one user device. Further, the communication device 1102 may be configured for receiving an input data corresponding to at least one gesture challenge information from at least one input device. Further, at least one input device may include at least one user device. Further, at least one input device may include at least one sensor configured for detecting a gesture attempt performed by at least one user. Further, at least one sensor may be configured for generating the input data. Further, the input data may include a gesture response comprising an image, an audio, a video, etc. associated with at least one gesture performed by at least one user. Further, the communication device 1102 may be configured for transmitting a personal information request to at least one user device. Further, the communication device 1102 may be configured for receiving a personal information data corresponding to the personal information request from at least one user device. Further, the communication device 1102 may be configured for transmitting at least one of a verification status, the gesture status, and the identification status to at least one user device.

Further, the processing device 1104 may be configured for analyzing the authentication request and a user data using at least one artificial intelligence model. Further, at least one artificial intelligence model may be based on a machine learning algorithm. Further, at least one artificial intelligence model may identify at least one user via facial recognition. Further, the processing device 1104 may be configured for generating an identification status based on the analyzing of the authentication request and the user data. Further, the identification status may include a positive identification status and a negative identification status. Further, the positive identification status may indicate that at least one user is successfully identified. Further, the negative identification status may indicate that at least one user is not identified. Further, the processing device 1104 may be configured for analyzing the input data and at least one gesture challenge information using at least one second machine learning model. Further, at least one second machine learning model may include a deep learning model. Further, the processing device 1104 may be configured for determining a gesture status based on the analyzing of input data and at least one gesture challenge information. Further, the gesture status may include a positive gesture verification status and a negative gesture verification status. Further, the positive gesture verification status may indicate that at least one user has successfully performed at least one gesture. Further, the negative identification status may indicate that at least one user hasn't successfully performed at least one gesture. Further, the gesture status may include a gesture data comprising gesture specifications. Further, the gesture specifications may include a timing of at least one gesture and a validity period of at least one gesture. Further, the processing device 1104 may be configured for generating the personal information request based on the determining of the positive gesture verification status. Further, the personal information request may notify at least one user to send a personal information data for further verification of at least one user. Further, the processing device 1104 may be configured for comparing the personal information data and a government document record for generating the verification status.

Further, the storage device 1106 may be configured for retrieving the user data associated with at least one user. Further, the user data may include a self-identifying data of at least one user. Further, the self-identifying data may include an image, an audio, a video, an audio-video, etc. Further, the storage device 1106 may be configured for retrieving at least one gesture challenge information based on the positive identification status. Further, at least one gesture challenge information may include an image, a video, an audio, etc. associated with at least one gesture that may be performed by at least one user. Further, the storage device 1106 may be configured for storing at least one of the verification status, the gesture status, the input data, the authentication request, the personal information data, and the identification status in a blockchain.

Figure 12A:
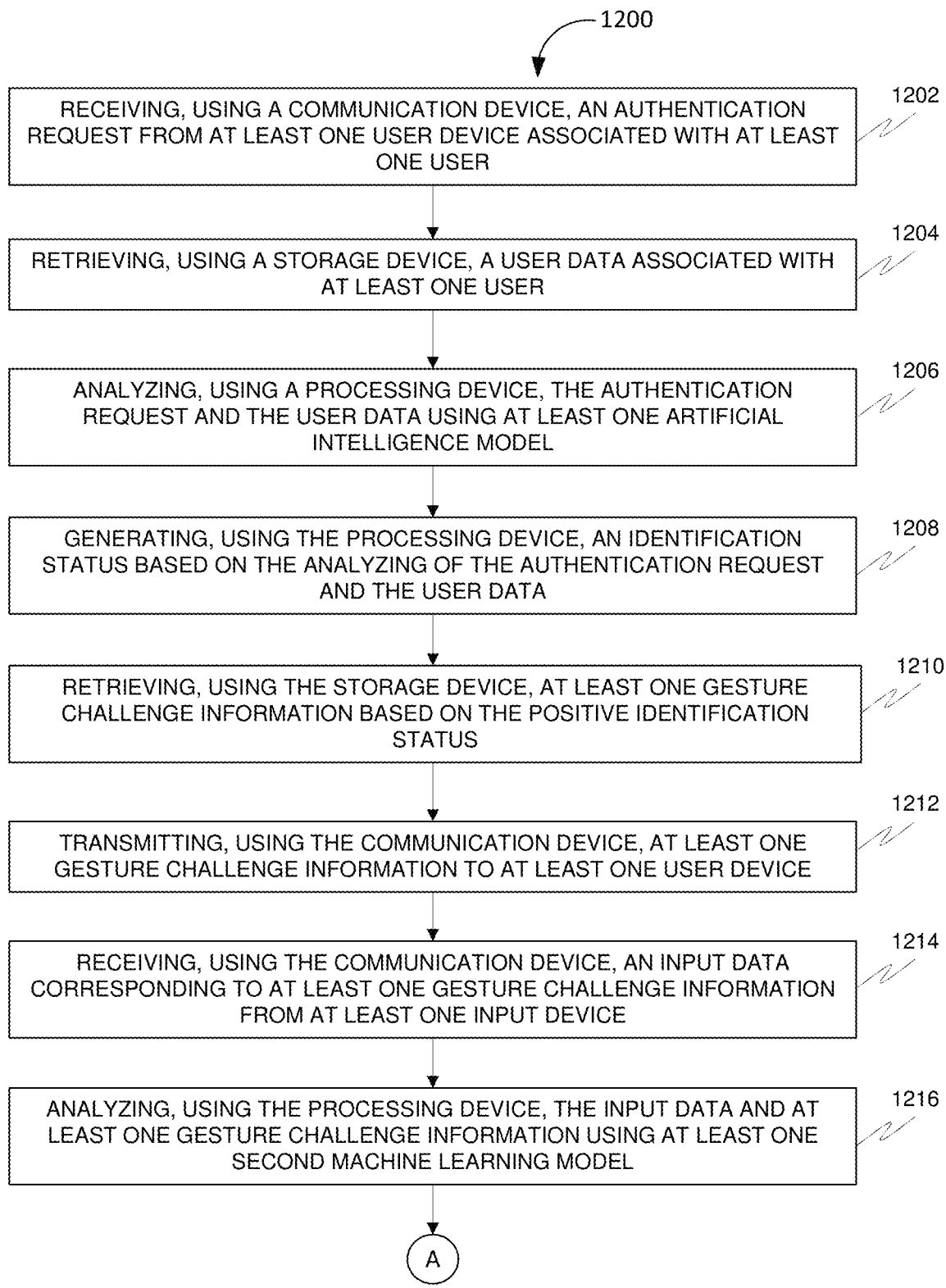
FIG. 12A is a flowchart of a method 1200 for facilitating performing point-in-time authentication for an interaction using blockchain, in accordance with some embodiments.

FIG. 12A is a flowchart of a method 1200 for facilitating performing point-in-time authentication for an interaction using blockchain, in accordance with some embodiments. Accordingly, at 1202, the method 1200 may include receiving, using a communication device, an authentication request from at least one user device associated with at least one user. Further, the authentication request may indicate that at least one user may want to perform point-in-time authentication for at least one interaction. Further, at least one interaction may include an online payment transaction. Further, at least one user may include an individual, an institution, and an organization. Further, at least one user device may include a smartphone, a tablet, a mobile, a laptop, a personal computer, and so on.

Further, at 1204, the method 1200 may include retrieving, using a storage device, a user data associated with at least one user. Further, the user data may include a self-identifying data of at least one user. Further, the self-identifying data may include an image, an audio, a video, an audio-video, etc.

Further, at 1206, the method 1200 may include analyzing, using a processing device, the authentication request and the user data using at least one artificial intelligence model. Further, at least one artificial intelligence model may be based on a machine learning algorithm. Further, at least one artificial intelligence model may identify at least one user via facial recognition.

Further, at 1208, the method 1200 may include generating, using the processing device, an identification status based on the analyzing of the authentication request and the user data. Further, the identification status may include a positive identification status and a negative identification status. Further, the positive identification status may indicate that at least one user is successfully identified. Further, the negative identification status may indicate that at least one user is not identified.

Further, at 1210, the method 1200 may include retrieving, using the storage device, at least one gesture challenge information based on the positive identification status. Further, at least one gesture challenge information may include an image, a video, an audio, etc. associated with at least one gesture that may be performed by at least one user. Further, at least one gesture may be selected randomly for at least one user. This may provide a random challenge experience for authenticating at least one user.

Further, at 1212, the method 1200 may include transmitting, using the communication device, at least one gesture challenge information to at least one user device.

Further, at 1214, the method 1200 may include receiving, using the communication device, an input data corresponding to at least one gesture challenge information from at least one input device. Further, at least one input device may include at least one user device. Further, at least one input device may include at least one sensor configured for detecting a gesture attempt performed by at least one user. Further, at least one sensor may be configured for generating the input data. Further, the input data may include a gesture response comprising an image, an audio, a video, etc. associated with at least one gesture performed by at least one user.

Further, at 1216, the method 1200 may include analyzing, using the processing device, the input data and at least one gesture challenge information using at least one second machine learning model. Further, at least one second machine learning model may include a deep learning model.

Further, at 1218, the method 1200 may include determining, using the processing device, a gesture status based on the analyzing of the input data and at least one gesture challenge information. Further, the gesture status may include a positive gesture verification status and a negative gesture verification status. Further, the positive gesture verification status may indicate that at least one user has successfully performed at least one gesture. Further, the negative identification status may indicate that at least one user hasn't successfully performed at least one gesture. Further, the gesture status may include a gesture data comprising gesture specifications. Further, the gesture specifications may include a timing of at least one gesture and a validity period of at least one gesture.

Further, at 1220, the method 1200 may include generating, using the processing device, a personal information request based on the determining of the positive gesture verification status. Further, the personal information request may notify at least one user to send personal information data for further verification of at least one user.

Further, at 1222, the method 1200 may include transmitting, using the communication device, the personal information request to at least one user device.

Further, at 1224, the method 1200 may include receiving, using the communication device, the personal information data corresponding to the personal information request from at least one user device. Further, the personal information data may include a government identification document, a pay stub, etc. Further, the government identification document may include a passport, a social security card, etc.

Further, at 1226, the method 1200 may include comparing, using the processing device, the personal information data and a government document record for generating a verification status. Further, the government document record may be maintained and verified by at least one government authority. Further, the government document record may include authenticated details of the personal information data associated with at least one user. Further, the verification status may reflect authenticity of the personal information data.

Further, at 1228, the method 1200 may include transmitting, using the communication device, at least one of the verification status, the gesture status, and the identification status to at least one user device.

Further, at 1230, the method 1200 may include storing, using the storage device, at least one of the verification status, the gesture status, the input data, the authentication request, the personal information data, and the identification status in a blockchain.

Further, in some embodiments, the method 1200 may include generating, using the processing device, a fraudulent activity alert based on the analyzing of the input data and at least one gesture challenge information. Further, the fraudulent activity alert may notify at least one second user that at least one user performed at least one fraudulent activity. Further, at least one second user may include an individual, an institution, and an organization that may want to authenticate at least one user. Further, at least one fraudulent activity may include the use of sinister artifacts in the video comprised of at least one of the input data and the user data. Further, in another instance, at least one fraudulent activity may include manipulation of the video that may indicate a deep fake. Further, the fraudulent activity alert may include a video, an image, an animation, an audio, an audio-video, etc. showing at least one user indulged in at least one fraudulent activity. Further, the method 1200 may include transmitting, using the communication device, the fraudulent activity alert to at least one second user device associated with at least one second user. Further, at least one second user device may include a smartphone, a tablet, a mobile, a laptop, a personal computer, and so on. Further, the method 1200 may include storing, using the storage device, the fraudulent activity alert in the blockchain.

Further, in some embodiments, the method 1200 may include determining, using the processing device, a reliability score based on the analyzing of the input data and at least one gesture challenge information. Further, the reliability score may include a rating corresponding to at least one user. Further, the method 1200 may include transmitting, using the communication device, the reliability score to at least one user device and at least one second user device associated with at least one second user. Further, the method 1200 may include storing, using the storage device, the reliability score, and other associated proof of identity related data in the blockchain.

Further, in some embodiments, the generating of the reliability score may be based on the generating of the fraudulent activity alert.

Further, in some embodiments, at least one gesture may include blinking of an eye, movement of a head, hand gesture, etc.

Further, in some embodiments, at least one gesture information may include a textual content. Further, in an instance, the textual content may include a mathematical equation, a random alphanumeric phrase, a paragraph, etc. Further, the input data may include a response to the textual content. Further, in an instance, the response to the mathematical equation may include a solution to the mathematical equation. Further, the response may be an audio. Further, in an instance, the response to the paragraph may include an audio, corresponding to the paragraph, recited by at least one user. Further, in an instance, the response to the random alphanumeric phrase may include an audio, corresponding to the random alphanumeric phrase, to be recited by at least one user.

Further, in some embodiments, the generating of the verification status may be based on the analyzing of at least one second sensor data.

Figure 12B:
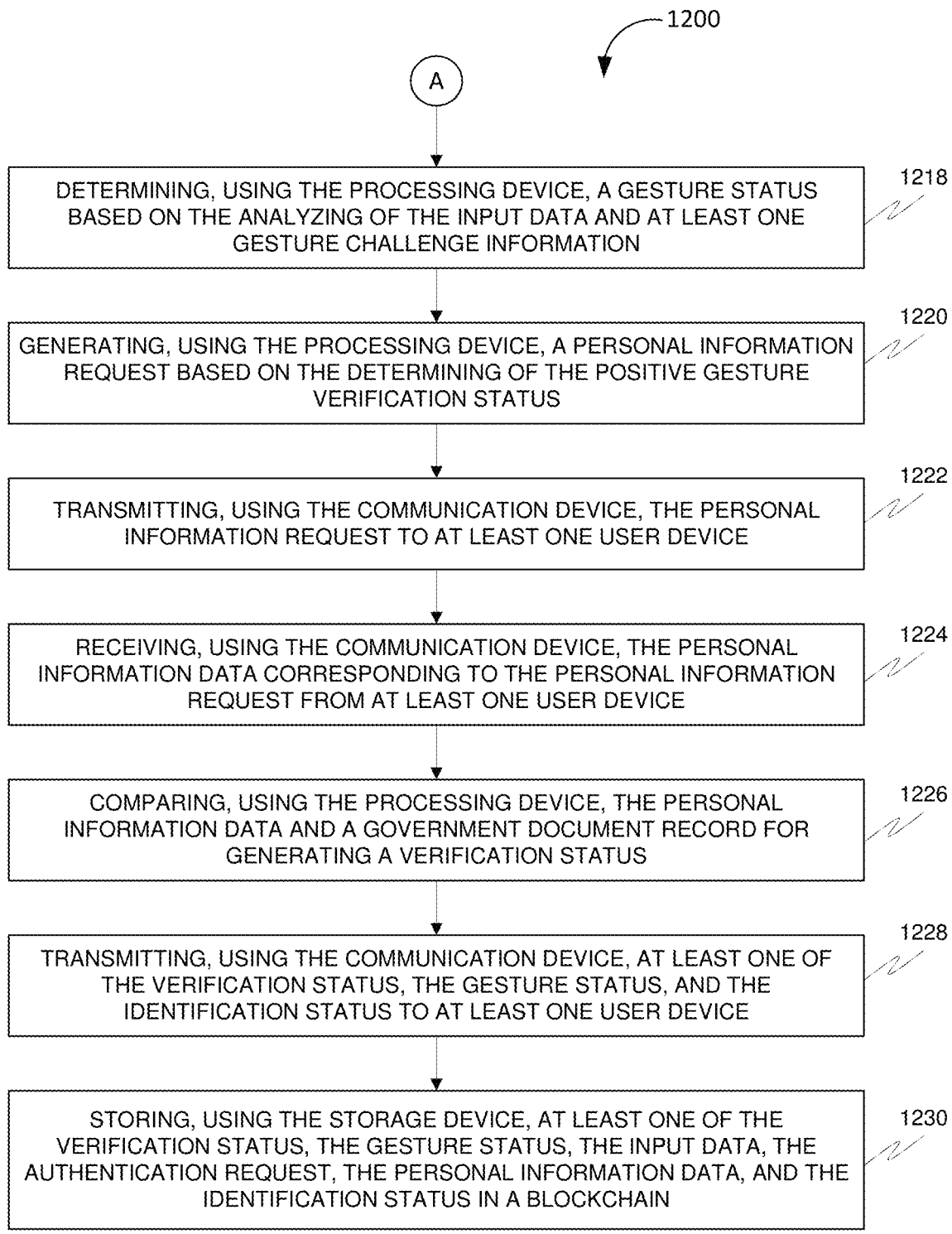
FIG. 12B is a continuation flowchart of the method 1200, in accordance with some embodiments.

FIG. 12B is a continuation flowchart of the method 1200, in accordance with some embodiments.

Figure 13:
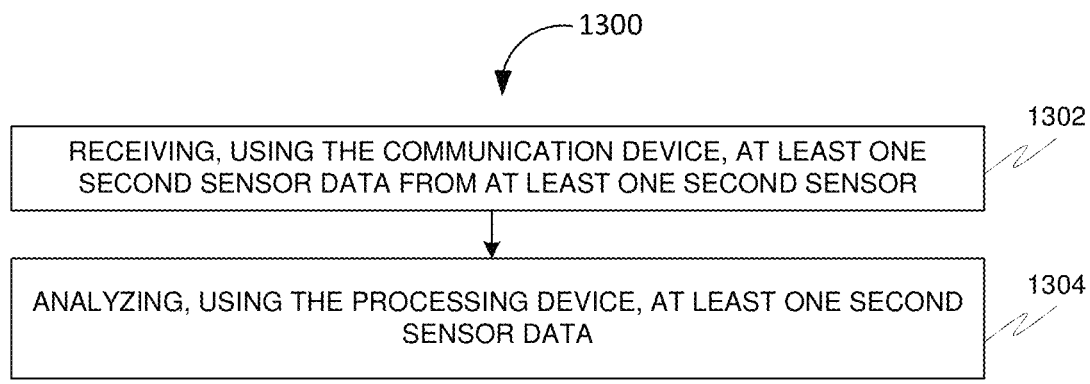
FIG. 13 is a flowchart of a method 1300 for facilitating performing point-in-time authentication for the interaction using blockchain, in accordance with some embodiments.

FIG. 13 is a flowchart of a method 1300 for facilitating performing point-in-time authentication for the interaction using blockchain, in accordance with some embodiments. Accordingly, at 1302, the method 1300 may include receiving, using the communication device, at least one second sensor data from at least one second sensor. Further, at least one second sensor may be configured for generating at least one second sensor data based on detecting at least one of a device parameter associated with at least one user device and a biometric variable associated with at least one user. Further, the device parameter may include geolocation data. Further, the geolocation data may include a historical geolocation record corresponding to at least one user device. Further, the historical geolocation record may include a time and a location of at least one user and at least one user device in the past. Further, the biometric variable may include a fingerprint, a palm-print, voice characteristics, behavioral characteristics, facial features, iris pattern, heart rate variability, evoked potentials, brain waves, and so on.

Further, at 1304, the method 1300 may include analyzing, using the processing device, at least one second sensor data. Further, the generating of the verification status may be based on the analyzing of at least one second sensor data.

Figure 14:
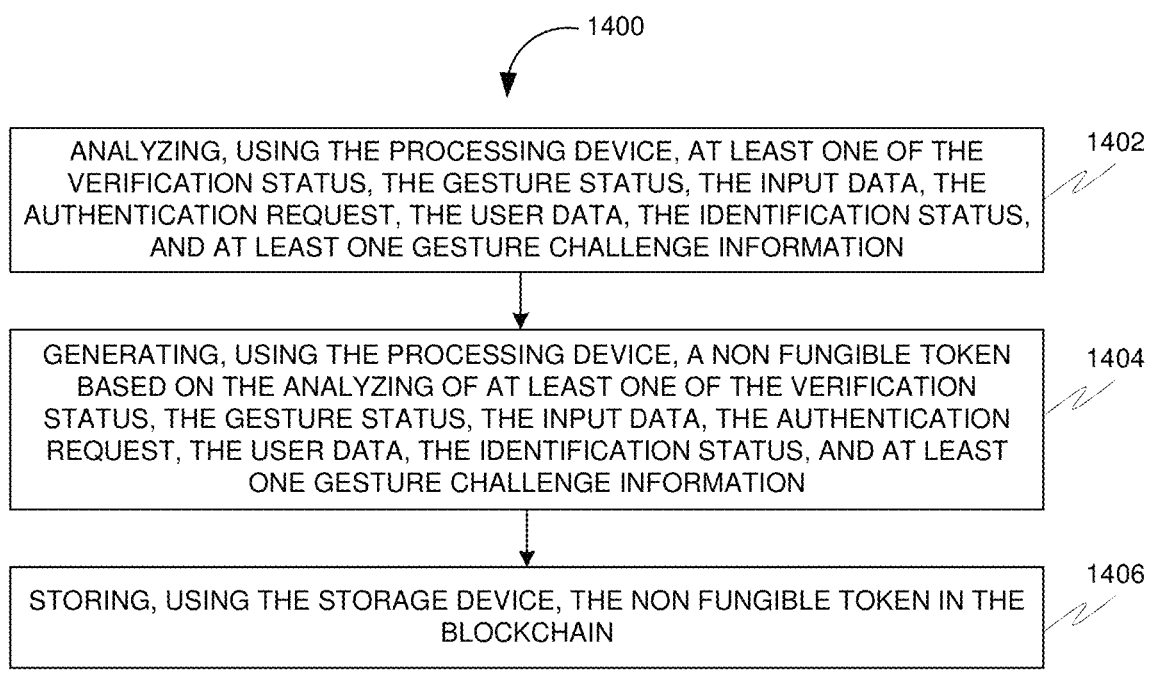
FIG. 14 is a flowchart of a method 1400 for facilitating performing point-in-time authentication for the interaction using blockchain, in accordance with some embodiments.

FIG. 14 is a flowchart of a method 1400 for facilitating performing point-in-time authentication for the interaction using blockchain, in accordance with some embodiments. Accordingly, at 1402, the method 1400 may include analyzing, using the processing device, at least one of the verification status, the gesture status, the input data, the authentication request, the user data, the identification status, and at least one gesture challenge information.

Further, at 1404, the method 1400 may include generating, using the processing device, a non-fungible token based on the analyzing of at least one of the verification status, the gesture status, the input data, the authentication request, the user data, the identification status, and at least one gesture challenge information.

Further, at 1406, the method 1400 may include storing, using the storage device, the non-fungible token in the blockchain and transacting with the non-fungible token to validate identities both at point of time and historically.

Figure 15:
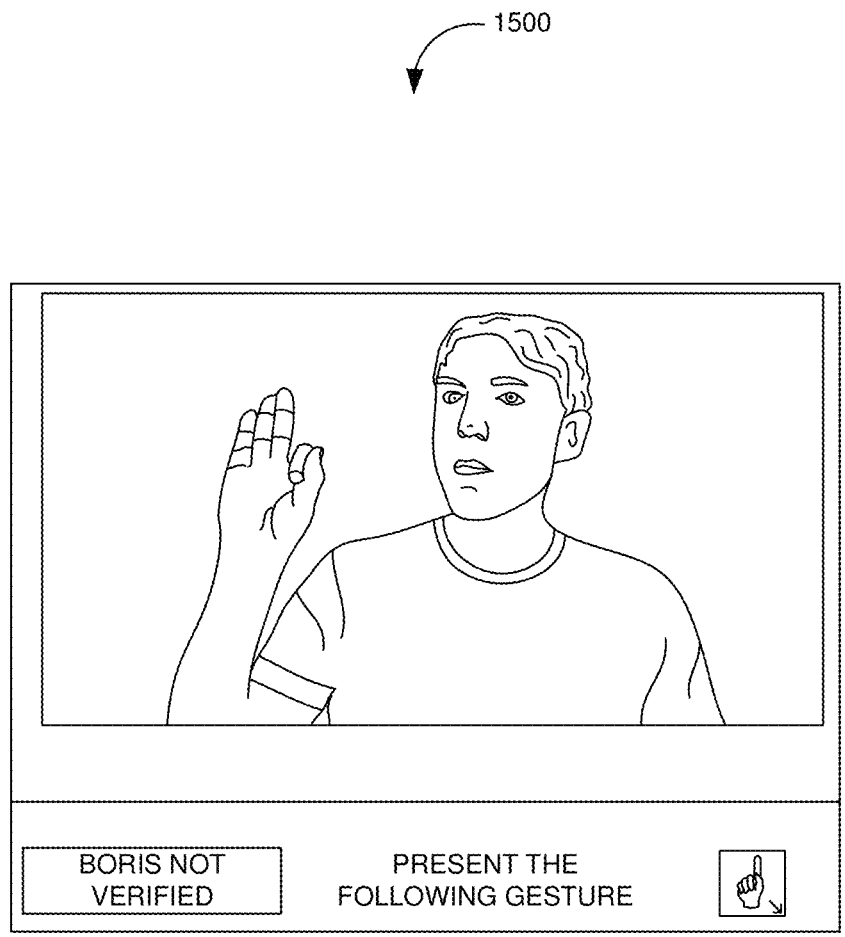
FIG. 15 is a screenshot of a user interface 1500 illustrating a user being authenticated by using the disclosed system, in accordance with some embodiments.
Figure 16:
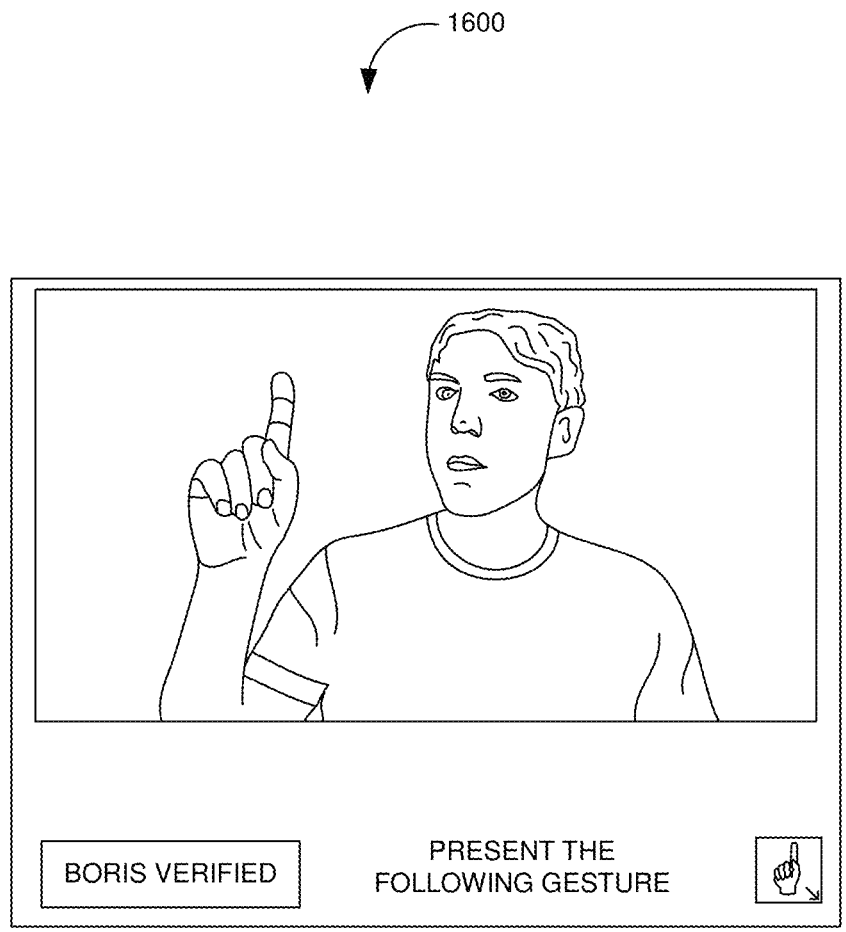
FIG. 16 is a screenshot of a user interface 1600 illustrating the user being authenticated by using the disclosed system, in accordance with some embodiments.

FIG. 15 is a screenshot of a user interface 1500 illustrating a user being authenticated by using the disclosed system, in accordance with some embodiments. Accordingly, the user interface 1500 shows that the user is currently not fully authenticated.

FIG. 16 is a screenshot of a user interface 1600 illustrating the user being authenticated by using the disclosed system, in accordance with some embodiments. Accordingly, the user interface 1600 shows that the user is fully authenticated.

Figure 17:
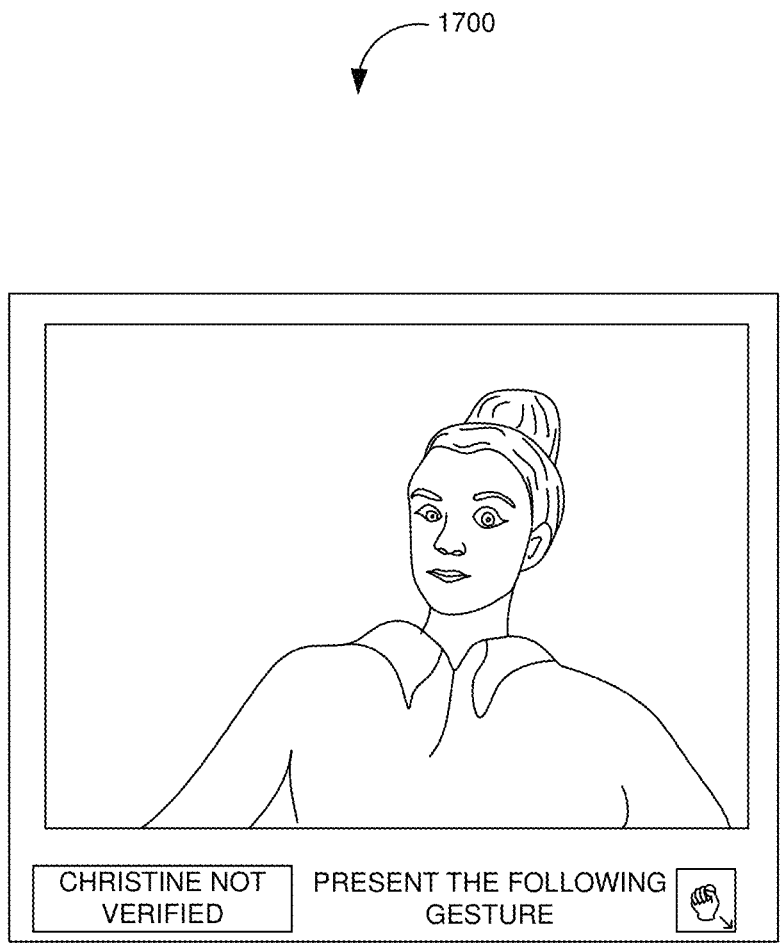
FIG. 17 is a screenshot of a user interface 1700 illustrating a second user being authenticated by using the disclosed system, in accordance with some embodiments.
Figure 18:
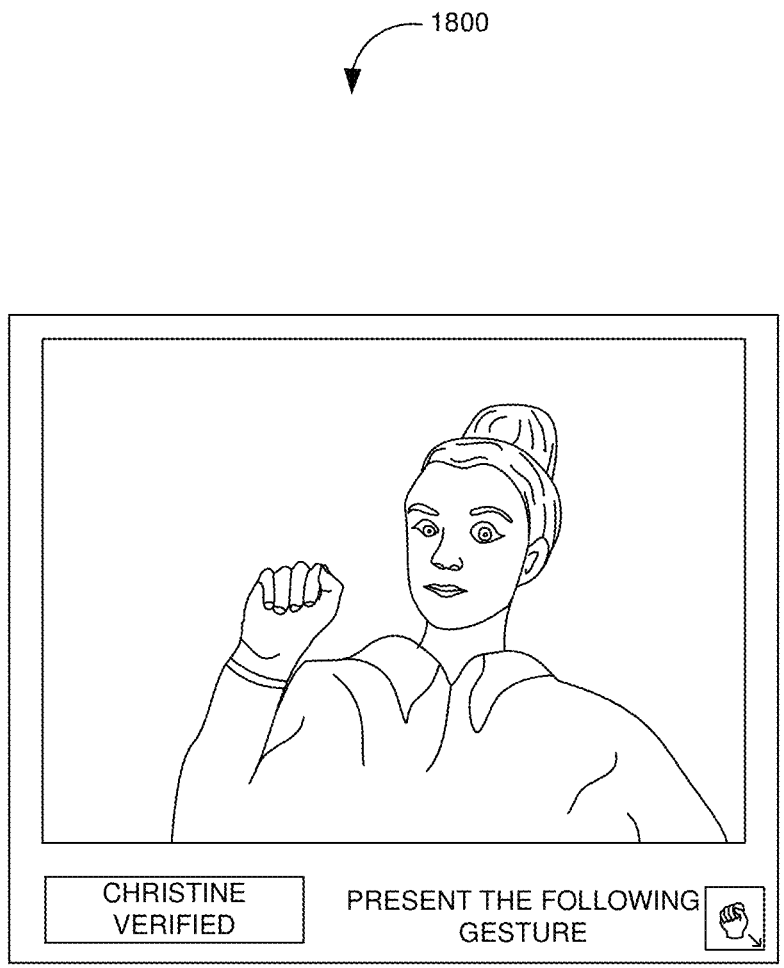
FIG. 18 is a screenshot of a user interface 1800 illustrating the second user being authenticated by using the disclosed system, in accordance with some embodiments.

FIG. 17 is a screenshot of a user interface 1700 illustrating a second user being authenticated by using the disclosed system, in accordance with some embodiments. Accordingly, the user interface 1700 shows that the second user is currently not fully authenticated.

FIG. 18 is a screenshot of a user interface 1800 illustrating the second user being authenticated by using the disclosed system, in accordance with some embodiments. Accordingly, the user interface 1800 shows that the second user is fully authenticated.

Figure 19:
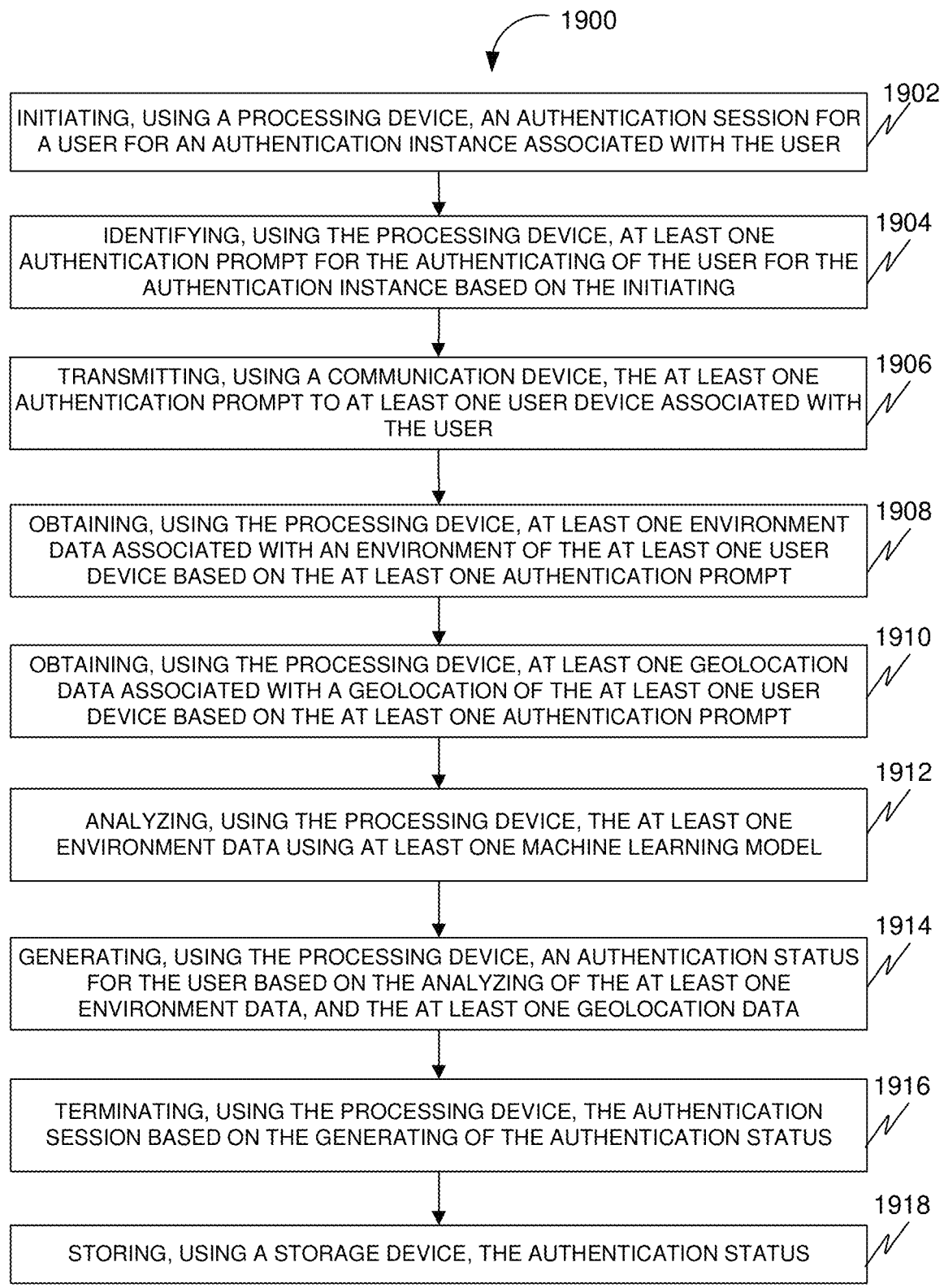
FIG. 19 is a flowchart of a method 1900 for facilitating accurate user authentication, in accordance with some embodiments.

FIG. 19 is a flowchart of a method 1900 for facilitating accurate user authentication, in accordance with some embodiments. Accordingly, at 1902, the method 1900 may include initiating, using a processing device, an authentication session for a user for an authentication instance associated with the user. Further, the user authentication may include a point-in-time authentication of the user. Further, the authentication instance may include a transaction, an interaction, etc. where a proof of identity of the user and a proof of geolocation of the user may be critical.

Further, at 1904, the method 1900 may include identifying, using the processing device, at least one authentication prompt for the authenticating of the user for the authentication instance based on the initiating.

Further, at 1906, the method 1900 may include transmitting, using a communication device, the at least one authentication prompt to at least one user device associated with the user.

Further, at 1908, the method 1900 may include obtaining, using the processing device, at least one environment data associated with an environment of the at least one user device based on the at least one authentication prompt. Further, in an embodiment, the obtaining of the at least one environment data may include receiving, using the communication device, the at least one environment data in response to the at least one authentication prompt from the at least one user device. Further, the at least one user device may be configured for generating the at least one environment data. Further, the environment may include a surrounding of the at least one user device, a surrounding of the user, etc.

Further, at 1910, the method 1900 may include obtaining, using the processing device, at least one geolocation data associated with a geolocation of the at least one user device based on the at least one authentication prompt. Further, in an embodiment, the obtaining of the at least one geolocation data may include receiving, using the communication device, the at least one geolocation data in response to the at least one authentication prompt from the at least one user device. Further, the at least one user device may be configured for generating the at least one geolocation data based on the at least one authentication prompt. Further, the geolocation may include a location of the at least one user device and the user. Further, the geolocation may include at least one of a latitude, a longitude, an altitude, and an orientation associated with the at least one user device and the user. Further, the geolocation corresponds to a geographic area, a geographic region, a geographic place, a geographic site, etc. Further, the geolocation may include a zip code, a county, a province, a region, a state, a country, etc. Further, the at least one geolocation data may include a GPS data.

Further, at 1912, the method 1900 may include analyzing, using the processing device, the at least one environment data using at least one machine learning model. Further, the at least one machine learning model may be configured for performing image recognition. Further, the at least one machine learning model may be trained using a training dataset. Further, the training dataset may include a plurality of training samples. Further, the at least one machine learning model may be configured for identifying a potential geolocation associated with the environment.

Further, at 1914, the method 1900 may include generating, using the processing device, an authentication status for the user based on the analyzing of the at least one environment data, and the at least one geolocation data. Further, the generating of the authentication status may be based on the potential geolocation and the geolocation. Further, the authentication status may include a successful identification and an unsuccessful identification of the user. Further, the authentication status may include the successful identification based on an identicality between the geolocation and the potential geolocation. Further, the authentication status may include the unsuccessful identification based on an unidenticality between the geolocation and the potential geolocation.

Further, at 1916, the method 1900 may include terminating, using the processing device, the authentication session based on the generating of the authentication status.

Further, at 1918, the method 1900 may include storing, using a storage device, the authentication status.

Further, in some embodiments, the at least one user device may include at least one environment sensor. Further, the at least one environment sensor may be configured for detecting the environment. Further, the detecting of the environment may include scanning, recording, capturing, etc., the environment. Further, the obtaining of the at least one environment data may include generating the at least one environment data based on the detecting of the environment. Further, the at least one user device may include at least one geolocation sensor. Further, the at least one geolocation sensor may include a location sensor, a global positioning system (GPS) sensor, a global navigation satellite system (GNSS) sensor, etc. Further, the at least one geolocation sensor may include a GPS receiver, a GNSS receiver, etc. Further, the at least one geolocation sensor may be configured for detecting the geolocation of the at least one user device. Further, the obtaining of the at least one geolocation data may include generating the at least one geolocation data based on the detecting of the geolocation of the at least one user device.

Further, in an embodiment, the at least one environment sensor may include at least one of an environment image sensor and an environment condition sensor. Further, the environment image sensor may include a visible light camera, an infrared camera, an ultraviolet camera, a hyperspectral camera, etc. Further, the environment condition sensor may include a temperature sensor, a humidity sensor, a pressure sensor, a wind direction sensor, a timing device, an air quality sensor, etc. Further, the environment image sensor may be configured for capturing at least one image of the environment. Further, the environment condition sensor may be configured for detecting at least one environment condition of the environment. Further, the at least one environment condition may include temperature, pressure, humidity, wind direction, time, air quality, etc. Further, the detecting of the environment may include the capturing of the at least one image of the environment, and the detecting of the at least one environment condition of the environment.

Figure 20:
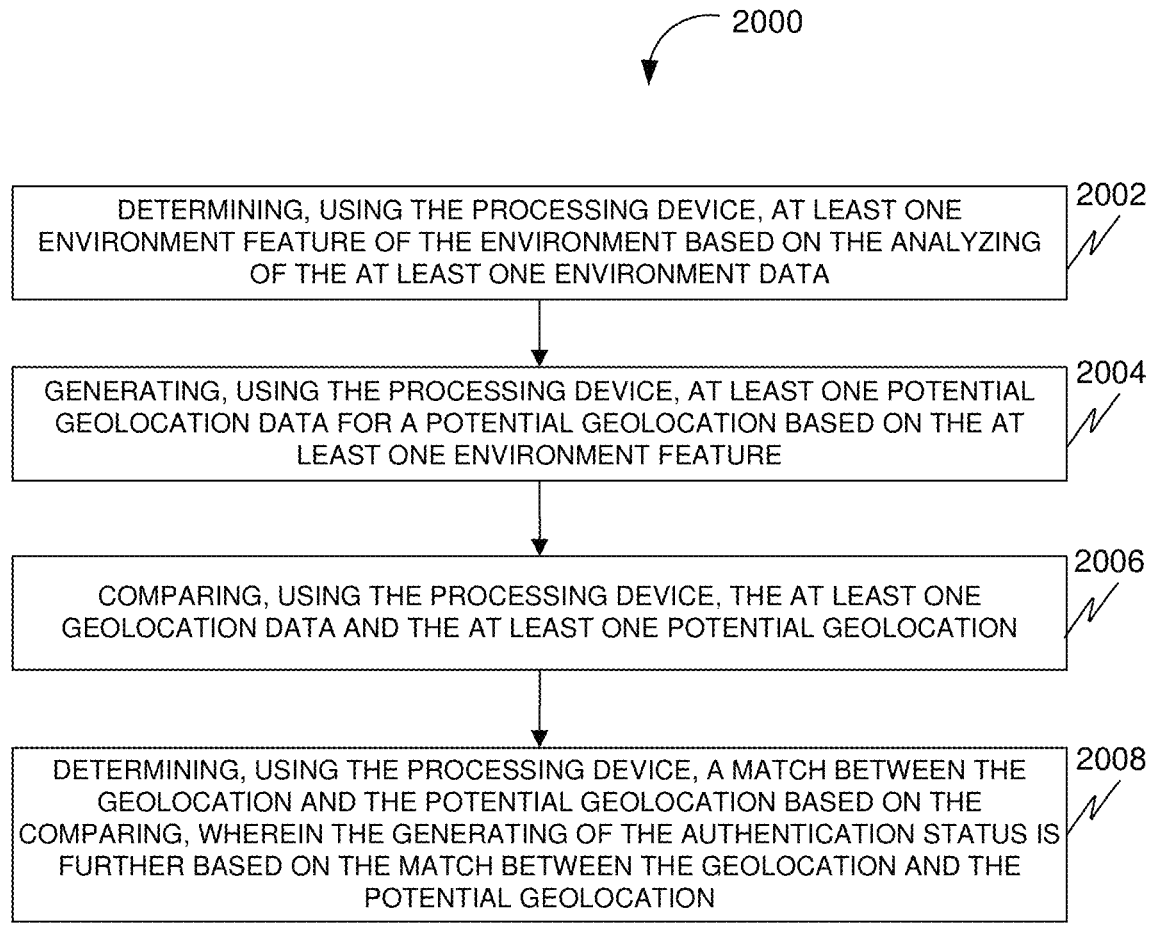
FIG. 20 is a flowchart of a method 2000 for facilitating the accurate user authentication, in accordance with some embodiments.

FIG. 20 is a flowchart of a method 2000 for facilitating the accurate user authentication, in accordance with some embodiments. Accordingly, at 2002, the method 2000 may include determining, using the processing device, at least one environment feature of the environment based on the analyzing of the at least one environment data. Further, the at least one environment feature may be a unique environment feature of the environment. Further, the at least one environment feature may include a natural landscape of the environment, a human made landscape of the environment, an infrastructure of the environment, a skyline of the environment, a weather of the environment, an architectural landmark (such as a historical structure, an iconic structure, etc.) of the environment, a street of the environment, a landmark structure (such as bridges, towers, etc.) of the environment, a public space (such as parks, public squares, statues, etc.) of the environment, a transportation infrastructure of the environment, etc.

Further, at 2004, the method 2000 may include generating, using the processing device, at least one potential geolocation data for a potential geolocation based on the at least one environment feature. Further, the potential geolocation may be a geolocation inferred from the at least one environment feature. Further, the potential geolocation may include a location of the at least one user device and the user. Further, the potential geolocation may include at least one of a latitude, a longitude, an altitude, and an orientation associated with the at least one user device and the user. Further, the potential geolocation corresponds to a geographic area, a geographic region, a geographic place, a geographic site, etc. Further, the potential geolocation may include a zip code, a county, a province, a region, a state, a country, etc.

Further, at 2006, the method 2000 may include comparing, using the processing device, the at least one geolocation data and the at least one potential geolocation data. Further, the comparing of the at least one geolocation data and the at least one potential geolocation data may include matching the geolocation with the potential geolocation.

Further, at 2008, the method 2000 may include determining, using the processing device, a match between the geolocation and the potential geolocation based on the comparing. Further, the generating of the authentication status may be based on the match between the geolocation and the potential geolocation.

Further, in some embodiments, the environment of the at least one user device may include the user and a user environment of the user. Further, the user environment may include a surrounding of the user. Further, the user may be present in the environment. Further, the at least one environment data may include at least one user image of the user, and at least one user environment image of the user environment. Further, the analyzing of the at least one environment data may include analyzing the at least one user environment image and the at least one user image. Further, the determining of the at least one environment feature may be based on the analyzing of the at least one user environment image and the at least one user image. Further, the potential geolocation may be associated with the user. Further, the geolocation may be associated with the user. Further, the determining of the match corresponds to a presence of the user in the geolocation.

Further, in some embodiments, the at least one machine learning model may include at least one convolutional neural network. Further, the analyzing of the at least one environment data may include analyzing the at least one environment data using the at least one convolutional neural network. Further, the at least one convolutional neural network may be trained using a training dataset. Further, the training dataset may include a plurality of annotated training samples. Further, each of the plurality of annotated training samples may include a representation of an environment feature and an identifier associated with the environment feature. Further, the determining of the at least one environment feature may include determining the at least one environment feature of the environment using the at least one convolutional neural network based on the analyzing of the at least one environment data using the at least one convolutional neural network. Further, the at least one convolutional neural network may be configured for extracting at least one feature from the at least one environment data. Further, the at least one feature corresponds to at least one spatial pattern in the at least one environment data. Further, the at least one environment data may include at least one representation of the environment. Further, the at least one convolution neural network may be configured for producing at least one identifier for the at least one feature based on the extracting. Further, the determining of the at least one environment feature may be based on the at least one identifier of the at least one feature.

Further, in an embodiment, the at least one machine learning model may include at least one recurrent neural network. Further, the analyzing of the at least one environment data may include analyzing the at least one environment data using the at least recurrent neural network and the at least one recurrent neural network. Further, the at least one recurrent neural network may be trained using a training dataset. Further, the determining of the at least one environment feature may include determining the at least one environment feature of the environment using the at least one convolutional neural network and the at least one recurrent neural network based on the analyzing of the at least one environment data using the at least one convolutional neural network and the at least one recurrent neural network. Further, the at least one recurrent neural network may be in series with the at least one convolutional neural network. Further, the at least one recurrent neural network may be configured for determining at least one temporal pattern in the at least one environment data. Further, the determining of the at least one environment feature may be based on the at least one temporal pattern.

Figure 21:
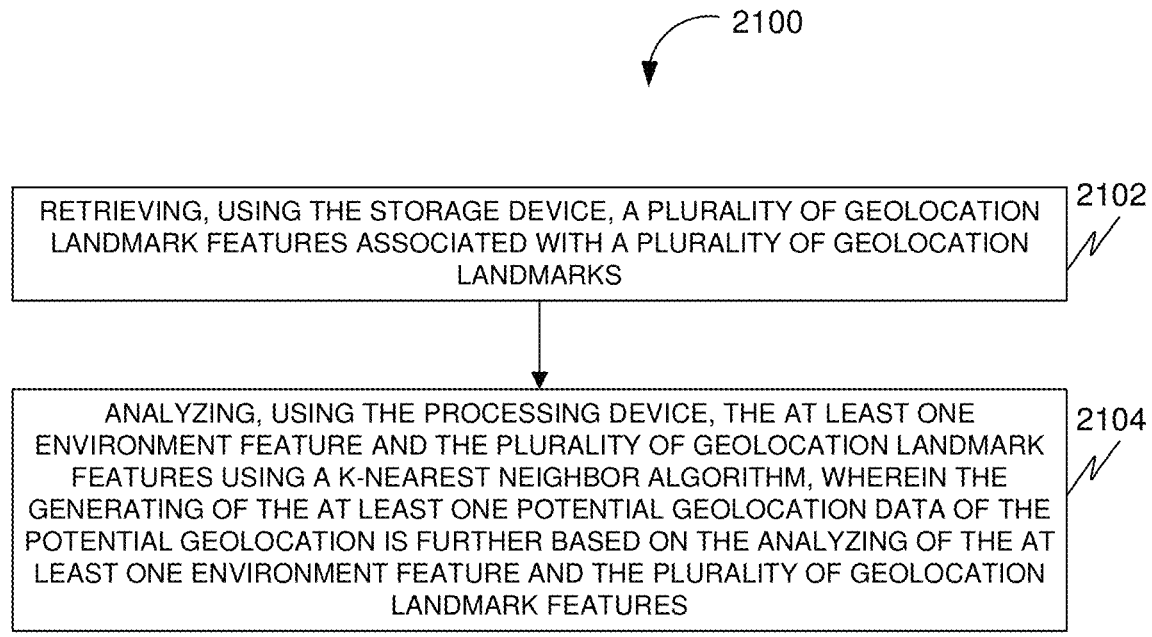
FIG. 21 is a flowchart of a method 2100 for facilitating the accurate user authentication, in accordance with some embodiments.

FIG. 21 is a flowchart of a method 2100 for facilitating the accurate user authentication, in accordance with some embodiments. Accordingly, at 2102, the method 2100 may include retrieving, using the storage device, a plurality of geolocation landmark features associated with a plurality of geolocation landmarks. Further, the plurality of geolocation landmark features may be features of the plurality of geolocation landmarks. Further, the plurality of geolocation landmarks may include an architectural landmark (such as a historical structure, an iconic structure, etc.), a street, a landmark structure (such as bridges, towers, etc.), a public space (such as parks, public squares, statues, etc.), a transportation infrastructure, etc.

Further, at 2104, the method 2100 may include analyzing, using the processing device, the at least one environment feature and the plurality of geolocation landmark features using a k-nearest neighbor algorithm. Further, the generating of the at least one potential geolocation data of the potential geolocation may be based on the analyzing of the at least one environment feature and the plurality of geolocation landmark features. Further, the analyzing of the at least one environment feature and the plurality of geolocation landmark features may include comparing the at least one environment feature with the plurality of geolocation landmark features using the k-nearest neighbor algorithm.

Figure 22:
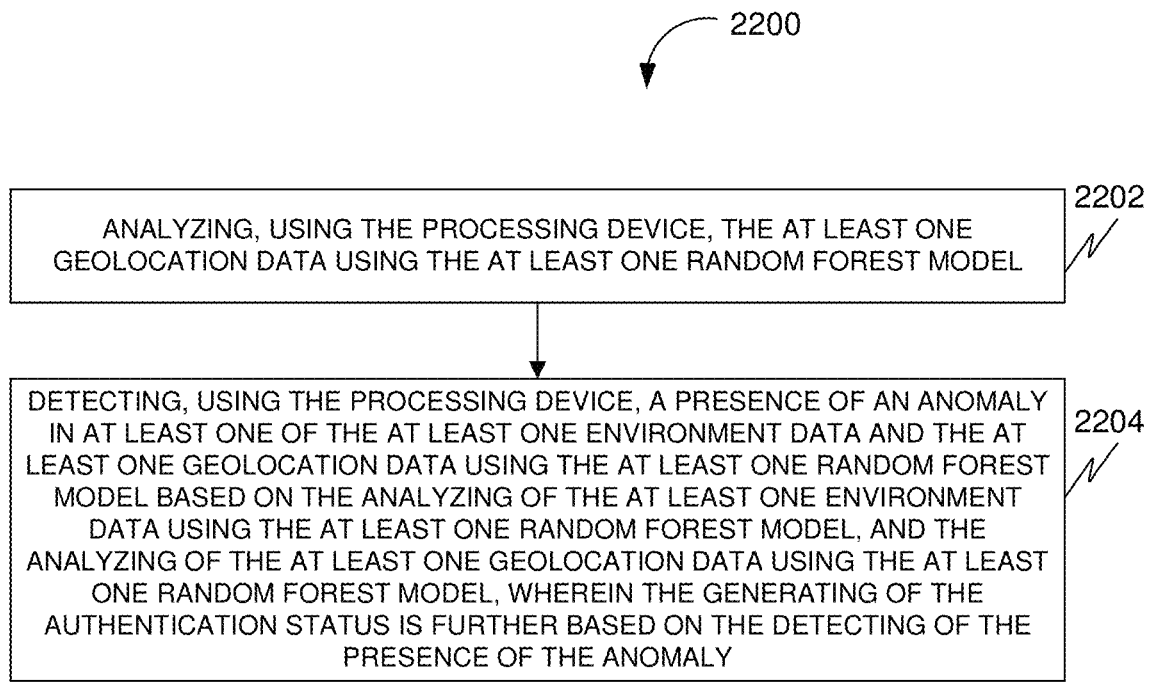
FIG. 22 is a flowchart of a method 2200 for facilitating the accurate user authentication, in accordance with some embodiments.

FIG. 22 is a flowchart of a method 2200 for facilitating the accurate user authentication, in accordance with some embodiments. Further, the at least one machine learning model may include at least one random forest model. Further, the analyzing of the at least one environment data may include analyzing the at least one environment data using the at least one random forest model. Further, the at least one random forest model may be trained using a training dataset. Further, the at least one random forest model may be configured for detecting at least one unusual pattern in the at least one environment data. Further, the at least one unusual pattern in the at least one environment data may be indicative of a spoofing attempt associated with the at least one environment data.

Further, at 2202, the method 2200 may include analyzing, using the processing device, the at least one geolocation data using the at least one random forest model. Further, the at least one random forest model may be configured for detecting at least one unusual pattern in the at least one geolocation data. Further, the at least one unusual pattern in the at least one geolocation data may be indicative of a spoofing attempt associated with the at least one geolocation data.

Further, at 2204, the method 2200 may include detecting, using the processing device, a presence of an anomaly in at least one of the at least one environment data and the at least one geolocation data using the at least one random forest model based on the analyzing of the at least one environment data using the at least one random forest model, and the analyzing of the at least one geolocation data using the at least one random forest model. Further, the generating of the authentication status may be further based on the detecting of the presence of the anomaly. Further, the detecting of the presence of the anomaly may be based on the detecting of the at least one unusual pattern in the at least one environment data, and the detecting of the at least unusual pattern in the at least one geolocation data.

Figure 23:
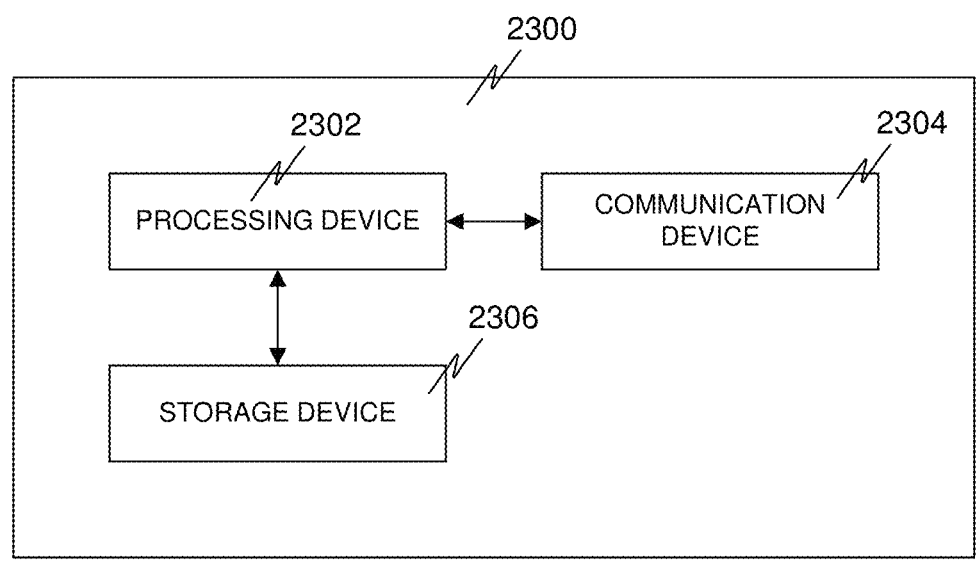
FIG. 23 is a block diagram of a system 2300 for facilitating accurate user authentication, in accordance with some embodiments.

FIG. 23 is a block diagram of a system 2300 for facilitating accurate user authentication, in accordance with some embodiments. Accordingly, the system 2300 may include a processing device 2302, a communication device 2304, and a storage device 2306.

Figure 24:
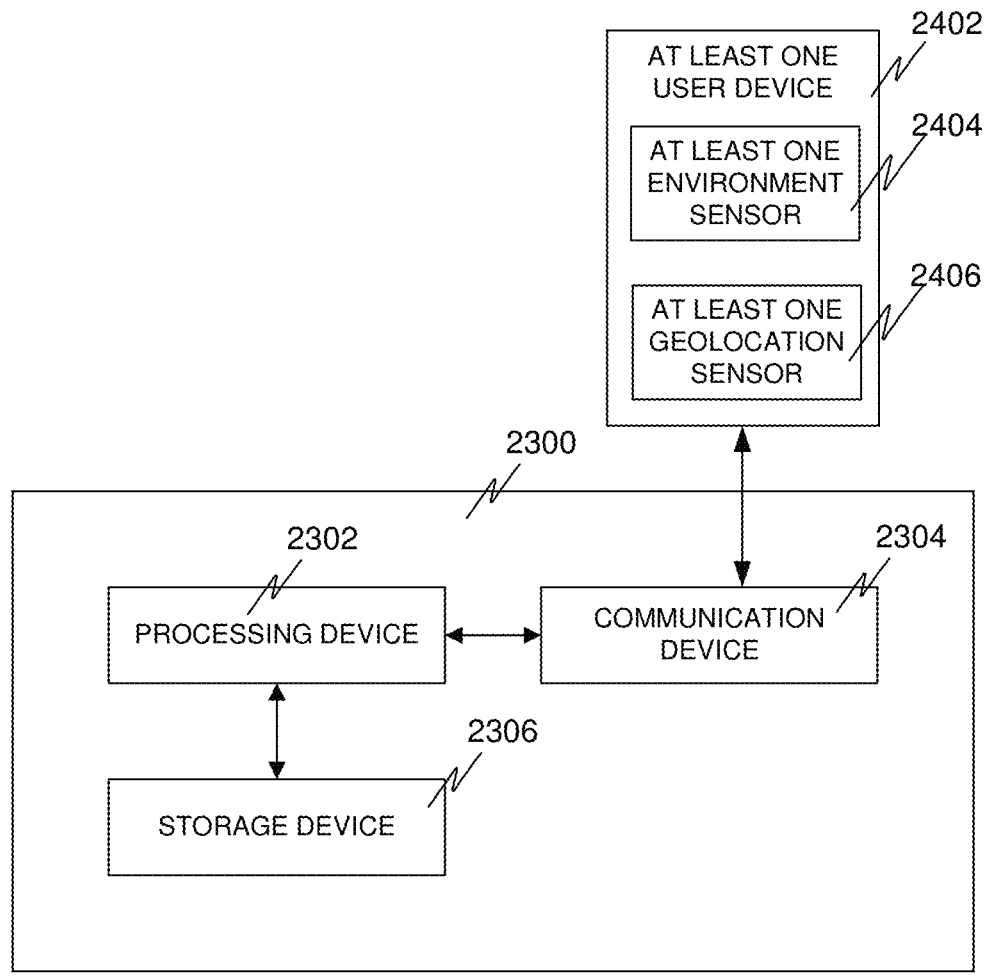
FIG. 24 is a block diagram of the system 2300 for facilitating the accurate user authentication, in accordance with some embodiments.

Further, the processing device 2302 may be configured for initiating an authentication session for a user for an authentication instance associated with the user. Further, the processing device 2302 may be configured for identifying at least one authentication prompt for the authenticating of the user for the authentication instance based on the initiating. Further, the processing device 2302 may be configured for obtaining at least one environment data associated with an environment of at least one user device 2402, as shown in FIG. 24, based on the at least one authentication prompt. Further, the processing device 2302 may be configured for obtaining at least one geolocation data associated with a geolocation of the at least one user device 2402 based on the at least one authentication prompt. Further, the processing device 2302 may be configured for analyzing the at least one environment data using at least one machine learning model. Further, the processing device 2302 may be configured for generating an authentication status for the user based on the analyzing of the at least one environment data, and the at least one geolocation data. Further, the processing device 2302 may be configured for terminating the authentication session based on the generating of the authentication status.

Further, the communication device 2304 may be communicatively coupled with the processing device 2302. Further, the communication device 2304 may be configured for transmitting the at least one authentication prompt to the at least one user device 2402 associated with the user.

Further, the storage device 2306 may be communicatively coupled with the processing device 2302. Further, the storage device 2306 may be configured for storing the authentication status.

Further, in some embodiments, the at least one user device 2402 may include at least one environment sensor 2404, as shown in FIG. 24. Further, the at least one environment sensor 2404 may be configured for detecting the environment. Further, the obtaining of the at least one environment data may include generating the at least one environment data based on the detecting of the environment. Further, the at least one user device 2402 may include at least one geolocation sensor 2406, as shown in FIG. 24. Further, the at least one geolocation sensor 2406 may be configured for detecting the geolocation of the at least one user device 2402. Further, the obtaining of the at least one geolocation data may include generating the at least one geolocation data based on the detecting of the geolocation of the at least one user device 2402.

Figure 25:
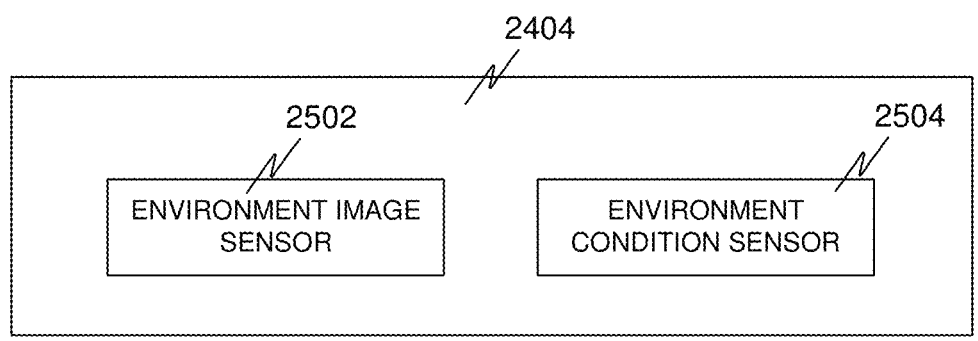
FIG. 25 is a block diagram of the at least one environment sensor 2404 of the system 2300 for facilitating the accurate user authentication, in accordance with some embodiments.

Further, in an embodiment, the at least one environment sensor 2404 may include at least one of an environment image sensor 2502 and an environment condition sensor 2504, as shown in FIG. 25. Further, the environment image sensor 2502 may be configured for capturing at least one image of the environment. Further, the environment condition sensor 2504 may be configured for detecting at least one environment condition of the environment. Further, the detecting of the environment may include the capturing of the at least one image of the environment, and the detecting of the at least one environment condition of the environment.

Further, in some embodiments, the processing device 2302 may be configured for determining at least one environment feature of the environment based on the analyzing of the at least one environment data. Further, the processing device 2302 may be configured for generating at least one potential geolocation data for a potential geolocation based on the at least one environment feature. Further, the processing device 2302 may be configured for comparing the at least one geolocation data and the at least one potential geolocation data. Further, the processing device 2302 may be configured for determining a match between the geolocation and the potential geolocation based on the comparing. Further, the generating of the authentication status may be based on the match between the geolocation and the potential geolocation.

Further, in an embodiment, the environment of the at least one user device 2402 may include the user and a user environment of the user. Further, the user may be present in the user environment. Further, the at least one environment data may include at least one user image of the user, and at least one user environment image of the user environment. Further, the analyzing of the at least one environment data may include analyzing the at least one user environment image and the at least one user image. Further, the determining of the at least one environment feature may be based on the analyzing of the at least one user environment image and the at least one user image. Further, the potential geolocation may be associated with the user. Further, the geolocation may be associated with the user. Further, the determining of the match corresponds to a presence of the user in the geolocation.

Further, in an embodiment, the at least one machine learning model may include at least one convolutional neural network. Further, the analyzing of the at least one environment data may include analyzing the at least one environment data using the at least one convolutional neural network. Further, the at least one convolutional neural network may be trained using a training dataset. Further, the determining of the at least one environment feature may include determining the at least one environment feature of the environment using the at least one convolutional neural network based on the analyzing of the at least one environment data using the at least one convolutional neural network. Further, in an embodiment, the at least one machine learning model may include at least one recurrent neural network. Further, the analyzing of the at least one environment data may include analyzing the at least one environment data using the at least recurrent neural network and the at least one recurrent neural network. Further, the at least one recurrent neural network may be trained using a training dataset. Further, the determining of the at least one environment feature may include determining the at least one environment feature of the environment using the at least one convolutional neural network and the at least one recurrent neural network based on the analyzing of the at least one environment data using the at least one convolutional neural network and the at least one recurrent neural network.

Further, in an embodiment, the storage device 2306 may be configured for retrieving a plurality of geolocation landmark features associated with a plurality of geolocation landmarks. Further, the processing device 2302 may be configured for analyzing the at least one environment feature and the plurality of geolocation landmark features using a k-nearest neighbor algorithm. Further, the generating of the at least one potential geolocation data of the potential geolocation may be based on the analyzing of the at least one environment feature and the plurality of geolocation landmark features.

Further, in some embodiments, the at least one machine learning model may include at least one random forest model. Further, the analyzing of the at least one environment data may include analyzing the at least one environment data using the at least one random forest model. Further, the at least one random forest model may be trained using a training dataset. Further, the processing device 2302 may be configured for analyzing the at least one geolocation data using the at least one random forest model. Further, the processing device 2302 may be configured for detecting a presence of an anomaly in at least one of the at least one environment data and the at least one geolocation data using the at least one random forest model based on the analyzing of the at least one environment data using the at least one random forest model, and the analyzing of the at least one geolocation data using the at least one random forest model. Further, the generating of the authentication status may be further based on the detecting of the presence of the anomaly.

FIG. 24 is a block diagram of the system 2300 for facilitating the accurate user authentication, in accordance with some embodiments.

FIG. 25 is a block diagram of the at least one environment sensor 2404 of the system 2300 for facilitating the accurate user authentication, in accordance with some embodiments.

Although the present disclosure has been explained in relation to its preferred embodiment, it is to be understood that many other possible modifications and variations can be made without departing from the spirit and scope of the disclosure.

What is claimed is:

1. A method for facilitating accurate user authentication, the method comprising:
   initiating, using a processing device, an authentication session for a user for an authentication instance associated with the user;
   identifying, using the processing device, at least one authentication prompt for the authenticating of the user for the authentication instance based on the initiating;
   transmitting, using a communication device, the at least one authentication prompt to at least one user device associated with the user;
   obtaining, using the processing device, at least one environment data associated with an environment of the at least one user device based on the at least one authentication prompt;
   obtaining, using the processing device, at least one geolocation data associated with a geolocation of the at least one user device based on the at least one authentication prompt;
   analyzing, using the processing device, the at least one environment data using at least one machine learning model, wherein the at least one machine learning model is configured for identifying a potential geolocation associated with the environment;
   generating, using the processing device, an authentication status for the user based on the analyzing of the at least one environment data, and the at least one geolocation data, wherein the generating of the authentication status is further based on the potential geolocation and the geolocation;
   terminating, using the processing device, the authentication session based on the generating of the authentication status; and
   storing, using a storage device, the authentication status.

2. The method of claim 1, wherein the at least one user device comprises at least one environment sensor, wherein the at least one environment sensor is configured for detecting the environment, wherein the obtaining of the at least one environment data comprises generating the at least one environment data based on the detecting of the environment, wherein the at least one user device comprises at least one geolocation sensor, wherein the at least one geolocation sensor is configured for detecting the geolocation of the at least one user device, wherein the obtaining of the at least one geolocation data comprises generating the at least one geolocation data based on the detecting of the geolocation of the at least one user device.

3. The method of claim 2, wherein the at least one environment sensor comprises at least one of an environment image sensor and an environment condition sensor, wherein the environment image sensor is configured for capturing at least one image of the environment, wherein the environment condition sensor is configured for detecting at least one environment condition of the environment, wherein the detecting of the environment comprises the capturing of the at least one image of the environment, and the detecting of the at least one environment condition of the environment.

4. The method of claim 1 further comprising:
   receiving, using the communication device, at least one information associated with the authentication instance from at least one device;
   analyzing, using the processing device, the at least one information using at least one first machine learning model; and
   determining, using the processing device, an authentication degree for the authentication instance based on the analyzing of the at least one information, wherein the identifying of the at least one authentication prompt comprises selecting the at least one authentication prompt from a plurality of authentication prompts for the authenticating of the user for the authentication instance based on the initiating, wherein the selecting of the at least one authentication prompt from the plurality of authentication prompts is further based on the authentication degree.

5. The method of claim 1 further comprising:
  determining, using the processing device, at least one environment feature of the environment based on the analyzing of the at least one environment data, wherein the at least one environment feature comprises at least one landmark of the environment;
  generating, using the processing device, at least one potential geolocation data for the potential geolocation based on the at least one environment feature;
  comparing, using the processing device, the at least one geolocation data and the at least one potential geolocation data; and
  determining, using the processing device, a match between the geolocation and the potential geolocation based on the comparing, wherein the generating of the authentication status is further based on the match between the geolocation and the potential geolocation.

6. The method of claim 5, wherein the environment of the at least one user device comprises the user and a user environment of the user, wherein the user is present in the user environment, wherein the at least one environment data comprises at least one user image of the user, and at least one user environment image of the user environment, wherein the analyzing of the at least one environment data comprises analyzing the at least one user environment image and the at least one user image, wherein the determining of the at least one environment feature is further based on the analyzing of the at least one user environment image and the at least one user image, wherein the potential geolocation is associated with the user, wherein the geolocation is associated with the user, wherein the determining of the match corresponds to a presence of the user in the geolocation.

7. The method of claim 5, wherein the at least one machine learning model comprises at least one convolutional neural network, wherein the analyzing of the at least one environment data comprises analyzing the at least one environment data using the at least one convolutional neural network, wherein the at least one convolutional neural network is trained using a training dataset, wherein the determining of the at least one environment feature comprises determining the at least one environment feature of the environment using the at least one convolutional neural network based on the analyzing of the at least one environment data using the at least one convolutional neural network.

8. The method of claim 7, wherein the at least one machine learning model further comprises at least one recurrent neural network, wherein the analyzing of the at least one environment data comprises analyzing the at least one environment data using the at least recurrent neural network and the at least one recurrent neural network, wherein the at least one recurrent neural network is trained using a training dataset, wherein the determining of the at least one environment feature comprises determining the at least one environment feature of the environment using the at least one convolutional neural network and the at least one recurrent neural network based on the analyzing of the at least one environment data using the at least one convolutional neural network and the at least one recurrent neural network.

9. The method of claim 5 further comprising:
  retrieving, using the storage device, a plurality of geolocation landmark features associated with a plurality of geolocation landmarks; and
  analyzing, using the processing device, the at least one environment feature and the plurality of geolocation landmark features using a k-nearest neighbor algorithm, wherein the generating of the at least one potential geolocation data of the potential geolocation is further based on the analyzing of the at least one environment feature and the plurality of geolocation landmark features.

10. The method of claim 1, wherein the at least one machine learning model comprises at least one random forest model, wherein the analyzing of the at least one environment data comprises analyzing the at least one environment data using the at least one random forest model, wherein the at least one random forest model is trained using a training dataset, wherein the method further comprises:
  analyzing, using the processing device, the at least one geolocation data using the at least one random forest model; and
  detecting, using the processing device, a presence of an anomaly in at least one of the at least one environment data and the at least one geolocation data using the at least one random forest model based on the analyzing of the at least one environment data using the at least one random forest model, and the analyzing of the at least one geolocation data using the at least one random forest model, wherein the generating of the authentication status is further based on the detecting of the presence of the anomaly.

11. A system for facilitating accurate user authentication, the system comprising:
  a processing device configured for:
    initiating an authentication session for a user for an authentication instance associated with the user;
    identifying at least one authentication prompt for the authenticating of the user for the authentication instance based on the initiating;
    obtaining at least one environment data associated with an environment of at least one user device based on the at least one authentication prompt;
    obtaining at least one geolocation data associated with a geolocation of the at least one user device based on the at least one authentication prompt;
    analyzing the at least one environment data using at least one machine learning model, wherein the at least one machine learning model is configured for identifying a potential geolocation associated with the environment;
    generating an authentication status for the user based on the analyzing of the at least one environment data, and the at least one geolocation data, wherein the generating of the authentication status is further based on the potential geolocation and the geolocation; and
    terminating the authentication session based on the generating of the authentication status;
  a communication device communicatively coupled with the processing device, wherein the communication device is configured for transmitting the at least one authentication prompt to the at least one user device associated with the user; and
  a storage device communicatively coupled with the processing device, wherein the storage device is configured for storing the authentication status.

12. The system of claim 11, wherein the at least one user device comprises at least one environment sensor, wherein the at least one environment sensor is configured for detecting the environment, wherein the obtaining of the at least one environment data comprises generating the at least one environment data based on the detecting of the environment, wherein the at least one user device comprises at least one geolocation sensor, wherein the at least one geolocation sensor is configured for detecting the geolocation of the at least one user device, wherein the obtaining of the at least one geolocation data comprises generating the at least one geolocation data based on the detecting of the geolocation of the at least one user device.

13. The system of claim 12, wherein the at least one environment sensor comprises at least one of an environment image sensor and an environment condition sensor, wherein the environment image sensor is configured for capturing at least one image of the environment, wherein the environment condition sensor is configured for detecting at least one environment condition of the environment, wherein the detecting of the environment comprises the capturing of the at least one image of the environment, and the detecting of the at least one environment condition of the environment.

14. The system of claim 11, wherein the communication device is further configured for receiving at least one information associated with the authentication instance from at least one device, wherein the processing device is further configured for:
analyzing the at least one information using at least one first machine learning model; and
determining an authentication degree for the authentication instance based on the analyzing of the at least one information, wherein the identifying of the at least one authentication prompt comprises selecting the at least one authentication prompt from a plurality of authentication prompts for the authenticating of the user for the authentication instance based on the initiating, wherein the selecting of the at least one authentication prompt from the plurality of authentication prompts is further based on the authentication degree.

15. The system of claim 11, wherein the processing device is further configured for:
determining at least one environment feature of the environment based on the analyzing of the at least one environment data, wherein the at least one environment feature comprises at least one landmark of the environment;
generating at least one potential geolocation data for the potential geolocation based on the at least one environment feature;
comparing the at least one geolocation data and the at least one potential geolocation data; and
determining a match between the geolocation and the potential geolocation based on the comparing, wherein the generating of the authentication status is further based on the match between the geolocation and the potential geolocation.

16. The system of claim 15, wherein the environment of the at least one user device comprises the user and a user environment of the user, wherein the user is present in the user environment, wherein the at least one environment data comprises at least one user image of the user, and at least one user environment image of the user environment, wherein the analyzing of the at least one environment data comprises analyzing the at least one user environment image and the at least one user image, wherein the determining of the at least one environment feature is further based on the analyzing of the at least one user environment image and the at least one user image, wherein the potential geolocation is associated with the user, wherein the geolocation is associated with the user, wherein the determining of the match corresponds to a presence of the user in the geolocation.

17. The system of claim 15, wherein the at least one machine learning model comprises at least one convolutional neural network, wherein the analyzing of the at least one environment data comprises analyzing the at least one environment data using the at least one convolutional neural network, wherein the at least one convolutional neural network is trained using a training dataset, wherein the determining of the at least one environment feature comprises determining the at least one environment feature of the environment using the at least one convolutional neural network based on the analyzing of the at least one environment data using the at least one convolutional neural network.

18. The system of claim 17, wherein the at least one machine learning model further comprises at least one recurrent neural network, wherein the analyzing of the at least one environment data comprises analyzing the at least one environment data using the at least one recurrent neural network and the at least one recurrent neural network, wherein the at least one recurrent neural network is trained using a training dataset, wherein the determining of the at least one environment feature comprises determining the at least one environment feature of the environment using the at least one convolutional neural network and the at least one recurrent neural network based on the analyzing of the at least one environment data using the at least one convolutional neural network and the at least one recurrent neural network.

19. The system of claim 15, wherein the storage device is further configured for retrieving a plurality of geolocation landmark features associated with a plurality of geolocation landmarks, wherein the processing device is further configured for analyzing the at least one environment feature and the plurality of geolocation landmark features using a k-nearest neighbor algorithm, wherein the generating of the at least one potential geolocation data of the potential geolocation is further based on the analyzing of the at least one environment feature and the plurality of geolocation landmark features.

20. The system of claim 11, wherein the at least one machine learning model comprises at least one random forest model, wherein the analyzing of the at least one environment data comprises analyzing the at least one environment data using the at least one random forest model, wherein the at least one random forest model is trained using a training dataset, wherein the processing device is further configured for:
analyzing the at least one geolocation data using the at least one random forest model; and
detecting a presence of an anomaly in at least one of the at least one environment data and the at least one geolocation data using the at least one random forest model based on the analyzing of the at least one environment data using the at least one random forest model, and the analyzing of the at least one geolocation data using the at least one random forest model, wherein the generating of the authentication status is further based on the detecting of the presence of the anomaly.

* * * * *